United States Patent
Shiraki

(10) Patent No.: US 10,855,606 B2
(45) Date of Patent: Dec. 1, 2020

(54) INFORMATION PROCESSING APPARATUS AND INFORMATION PROCESSING SYSTEM

(71) Applicant: FUJITSU LIMITED, Kawasaki (JP)

(72) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 51 days.

(21) Appl. No.: 16/272,538

(22) Filed: Feb. 11, 2019

(65) Prior Publication Data

US 2019/0280982 A1    Sep. 12, 2019

(30) Foreign Application Priority Data

Mar. 7, 2018  (JP) ................................. 2018-040844
Jul. 10, 2018  (JP) ................................. 2018-130948

(51) Int. Cl.
*H04L 12/863* (2013.01)
*H04L 12/801* (2013.01)
*H04L 12/825* (2013.01)
*H04L 12/851* (2013.01)
*H04L 12/935* (2013.01)

(52) U.S. Cl.
CPC ............. *H04L 47/25* (2013.01); *H04L 47/11* (2013.01); *H04L 47/2483* (2013.01); *H04L 47/29* (2013.01); *H04L 47/6255* (2013.01); *H04L 49/3027* (2013.01)

(58) Field of Classification Search
CPC ......... H04L 47/30; H04L 45/38; H04L 47/20; H04L 47/29; H04L 47/33; H04L 47/6255; H04L 12/5602; H04L 45/22; H04L 47/10; H04L 47/115; H04L 47/122
See application file for complete search history.

(56) References Cited

U.S. PATENT DOCUMENTS

2010/0172348 A1    7/2010  Saito et al.
2015/0281102 A1*  10/2015  Lee .......................... H04L 47/29
                                                                   370/236
2016/0269322 A1*   9/2016  Nakagawa ............... H04L 45/22

FOREIGN PATENT DOCUMENTS

JP       03-175843      7/1991
JP       2010-161546    7/2010
JP       2015-186142    10/2015

* cited by examiner

*Primary Examiner* — Sai Aung
(74) *Attorney, Agent, or Firm* — Fujitsu Patent Center

(57) ABSTRACT

An information processing apparatus includes a memory and a processor coupled to the memory. The processor is configured to acquire a feature amount related to a flow composed of a plurality of packets. The processor is configured to control a transmission of the plurality of packets based on the acquired feature amount.

9 Claims, 29 Drawing Sheets

FIG. 4

| ADDRESS | HEADER INFORMATION | FREQUENCY INFORMATION |
|---|---|---|
| 0 | INFO#1 | CNT#1 |
| 1 | INFO#2 | CNT#2 |
| 2 | INFO#3 | CNT#3 |

FIG. 5

| FID | TRANSFER AMOUNT |
|---|---|
| 0 | AAA |
| 1 | BBB |
| 2 | CCC |

| FID | QID | QUEUE COUNTER |
|---|---|---|
| 0 | Que#1 | CNT#1 |
| 1 | Que#2 | CNT#2 |
| 2 | Que#3 | CNT#3 |

| ADDRESS | HEADER INFORMATION | FREQUENCY INFORMATION |
|---|---|---|
| 0 | XX | CNT#1 |
| 1 | YY | CNT#2 |
| 2 | ZZ | CNT#3 |

| FID | QID | QUEUE COUNTER | PORT |
|---|---|---|---|
| 0 | Que#1 | CNT##1 | TRANSMISSION PORT 181 |
| ... | ... | ... | ... |
| 0 | Que#1 | CNT##2 | TRANSMISSION PORT 182 |
| ... | ... | ... | ... |
| 3 | Que#3 | CNT##3 | TRANSMISSION PORT 181 |
| ... | ... | ... | ... |
| 3 | Que#3 | CNT##4 | TRANSMISSION PORT 182 |

| FID | QID | QUEUE COUNTER | CONGESTION INFORMATION |
|---|---|---|---|
| 0 | Que#1 | CNT#1 | OCCURRENCE |
| 1 | Que#2 | CNT#2 | NO OCCURRENCE |
| 2 | Que#3 | CNT#3 | NO OCCURRENCE |

INFORMATION PROCESSING APPARATUS AND INFORMATION PROCESSING SYSTEM

CROSS-REFERENCE TO RELATED APPLICATION

This application is based upon and claims the benefit of priority of the prior Japanese Patent Application No. 2018-130948, filed on Jul. 10, 2018, and the prior Japanese Patent Application No. 2018-040844, filed on Mar. 7, 2018, the entire contents of which are incorporated herein by reference.

FIELD

The embodiments discussed herein are related to an information processing apparatus and an information processing system.

BACKGROUND

The performance of server computers and client computers has been remarkably improved in recent years, and there has been a growing demand for higher performance of communication in accordance with the performance improvement of the computers. In order to implement higher performance of communication, a control is required at the level of a flow, which is a flow of data for which the transmission source and the transmission destination of communication are determined.

The flow includes, for example, the traffic of access to the storage and the traffic of making inquiries. In the case of access to the storage, a large amount of data is often transferred using large packets. In contrast, in the case of making inquiries, data is often transferred using small packets. Since the size of the packets is different for each flow, the efficiency of the packet transfer may be improved by controlling at the flow level, and the improvement of the communication performance may be implemented.

When performing a control at such a flow level, it is conceivable to switch the queue that accumulates the packet to be transmitted according to the flow. For example, since in the case of small packets, it is required to lower the latency, it is preferable that packets stored in the queue are processed quickly. In contrast, since it is required to increase the throughput in the case of large packets, it is preferable that the packets are always present without leaving the queue empty. Therefore, for example, it is conceivable to make a queue that stores small packets different from a queue that stores large packets.

As such, as a method of switching the queue by the control at the flow level, there is a technique in the related art that switches the queue according to the transfer amount by comparing the header information using an access control list (ACL). There is also a technique in the related art that uses a hash value to specify the flow and changes the assignment destination of the flow that has no remaining packets in the queue to a light queue.

Related techniques are disclosed in, for example, Japanese Laid-open Patent Publication No. 2010-161546.

However, in the related art that uses the ACL to switch the queue, manual settings are performed to switch the queue, which makes it difficult to automate and to respond to fast switching. In addition, even when the related art is used to specify the flow and switch the queue of the flow which has no remaining packets in the queue, an automatic switching of the queue is not performed and it is difficult to smoothly switch the queue.

SUMMARY

According to an aspect of the present invention, provided is an information processing apparatus including a memory and a processor coupled to the memory. The processor is configured to acquire a feature amount related to a flow composed of a plurality of packets. The processor is configured to control a transmission of the plurality of packets based on the acquired feature amount.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a flow identification table;

FIG. 5 is a diagram illustrating an example of a transfer amount table;

FIG. 6 is a diagram illustrating an example of a queue information management table;

FIG. 14 is a diagram illustrating an example of a flow identification table according to a second embodiment;

FIG. 16 is a diagram illustrating an example of a queue information management table according to a third embodiment;

FIG. 20 is a diagram illustrating an example of a queue information management table according to the fifth embodiment;

DESCRIPTION OF EMBODIMENTS

Hereinafter, embodiments of the present disclosure will be described in detail with reference to the accompanying drawings. The technique disclosed in the present disclosure is not limited by the following embodiments.

First Embodiment

Figure 1:
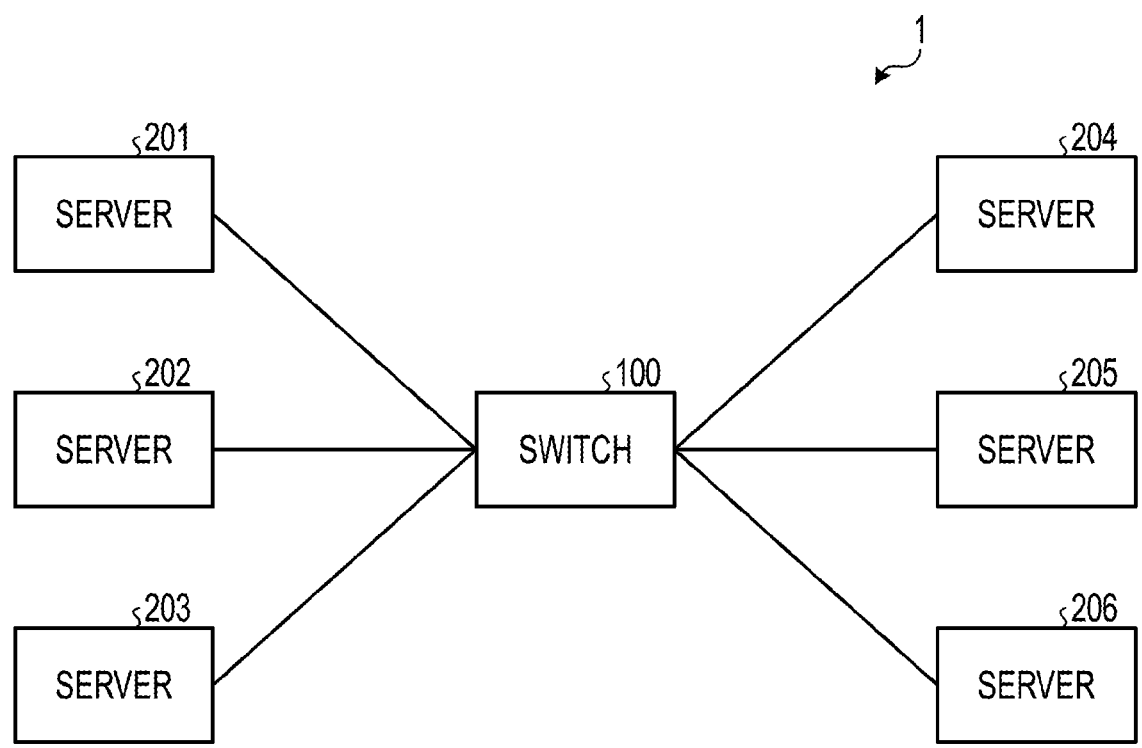
FIG. 1 is a diagram illustrating a schematic configuration of an information processing system according to a first embodiment.

FIG. 1 is a diagram illustrating a schematic configuration of an information processing system according to a first embodiment. As illustrated in FIG. 1, the information processing system 1 according to the present embodiment includes a switch 100 and servers 201 to 206.

Each of the servers 201 to 206 is connected to the switch 100. Then, each of the servers 201 to 206 exchanges packets with each other via the switch 100. In the following description, when the servers 201 to 206 are not distinguished with each other, the servers 201 to 206 are referred to as a server 200. Then, the server 200 functioning as a transmission source of the packet is referred to as a "transmitting side server 200," and the server 200 functioning as a transmission destination of the packet is referred to as a "receiving side server 200." For example, when the server 201 transmits a packet to the server 204, the server 201 is the transmitting side server 200 and the server 204 is the receiving side server 200.

The switch 100 receives a packet transmitted from the transmitting side server 200 and addressed to the receiving side server 200. Then, the switch 100 transmits the packet transmitted from the transmitting side server 200 from the port connected to the server 200 to the receiving side server 200.

Here, FIG. 1 illustrates a case where the servers 200 are connected by one switch 100, but the connection form is not limited thereto. The switch 100 may be connected to the transmitting side server 200 and the receiving side server 200 via the other communication device. In addition, although FIG. 1 illustrates six servers 201 to 206, the number of servers is not particularly limited.

Here, descriptions will be made on a flow by packet transmission from the transmitting side server 200 to the receiving side server 200. The transmitting side server 200 and the receiving side server 200 perform communication to transmit a series of related packets. Such a series of packets is called a "flow."

The packet includes a header including information that controls the transmission/reception of packets and a payload including data to be transmitted. The packet information, which is information that identifies the flow, is stored in the header of the packet. Here, the same information is stored as the information that identifies the flow in each of the packets transmitted and received as the same flow.

The header of the packet stores, for example, a reception destination address, transmission source information, reception destination information, a protocol, a transmission source port number, and a reception destination port number. For example, the transmission source information is a transmission source IP (Internet protocol), and the reception destination information is a reception destination IP. In the present embodiment, five pieces of information which are called a 5-tuple, that is, a transmission source IP, a reception destination IP, a transmission source port number, a reception destination port number, and a protocol are used as information that identifies the flow. However, the information that identifies the flow is sufficient as long as such information may specify a processing of transmitting a series of packets represented as a flow, and other information may be used.

Figure 2:
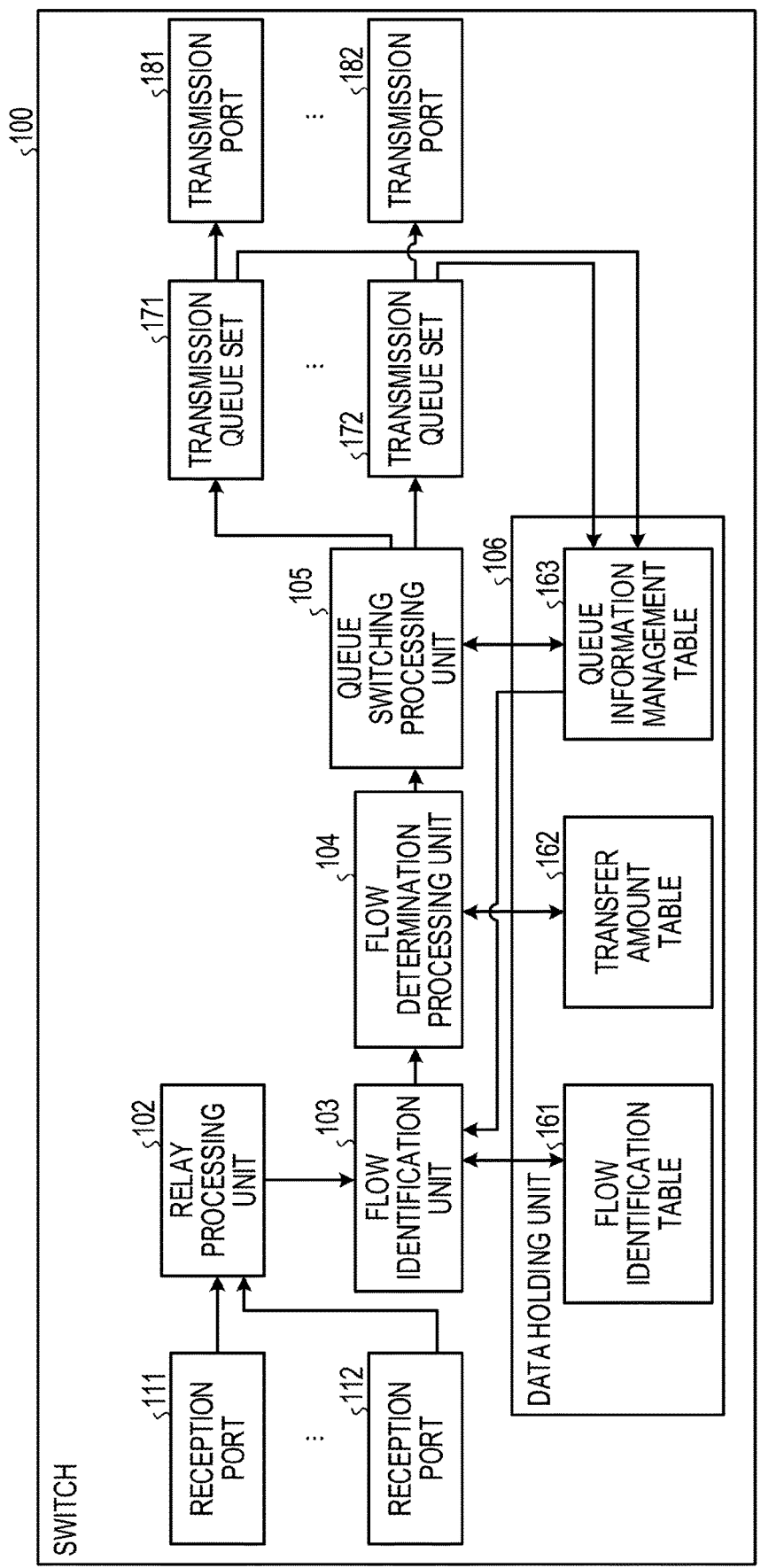
FIG. 2 is a block diagram of a switch according to the first embodiment.

Next, the details of the switch 100 will be described with reference to FIG. 2. FIG. 2 is a block diagram of the switch according to the first embodiment. This switch 100 corresponds to an example of an "information processing apparatus."

As illustrated in FIG. 2, the switch 100 includes reception ports 111 and 112, a relay processing unit 102, a flow identification unit 103, a flow determination processing unit 104, a queue switching processing unit 105, a data holding unit 106, transmission queue sets 171 and 172, and transmission ports 181 and 182. Further, the data holding unit 106 includes a flow identification table 161, a transfer amount table 162, and a queue information management table 163.

The reception ports 111 and 112 have the same function, and hereinafter will be referred to as a "reception port 110" unless they are distinguished from each other. In addition, the transmission ports 181 and 182 have the same function, and hereinafter will be referred to as a "transmission port 180" unless distinguished from each other.

The reception ports 111 and 112 are connected to one or several servers 200 (not illustrated). The reception ports 111 and 112 receive the input of packets from the transmitting side server 200 of a connection destination. The reception ports 111 and 112 then output the input packets to the relay processing unit 102.

The relay processing unit 102 receives the input of packets from the reception port 110. The relay processing unit 102 determines the transmission port 180 from which the packets are output from the reception destination information stored in the header and the information of the receiving side server 200 such as the reception destination port. Then, the relay processing unit 102 outputs the packets and the packet information including the transmission source IP, the reception destination IP, the transmission source port number, the reception destination port number, and the protocol together with the transmission port ID (Identifier), which is an identifier of the determined transmission port 180, to the flow identification unit 103. Here, since the packet information is actually included in the header of the packet, the packet information may also be sent by sending the packet. However, in the explanation here, in order to make it clear that the packet information is exchanged, descriptions will be made as if the packet information is also transmitted together with packets.

Figure 3:
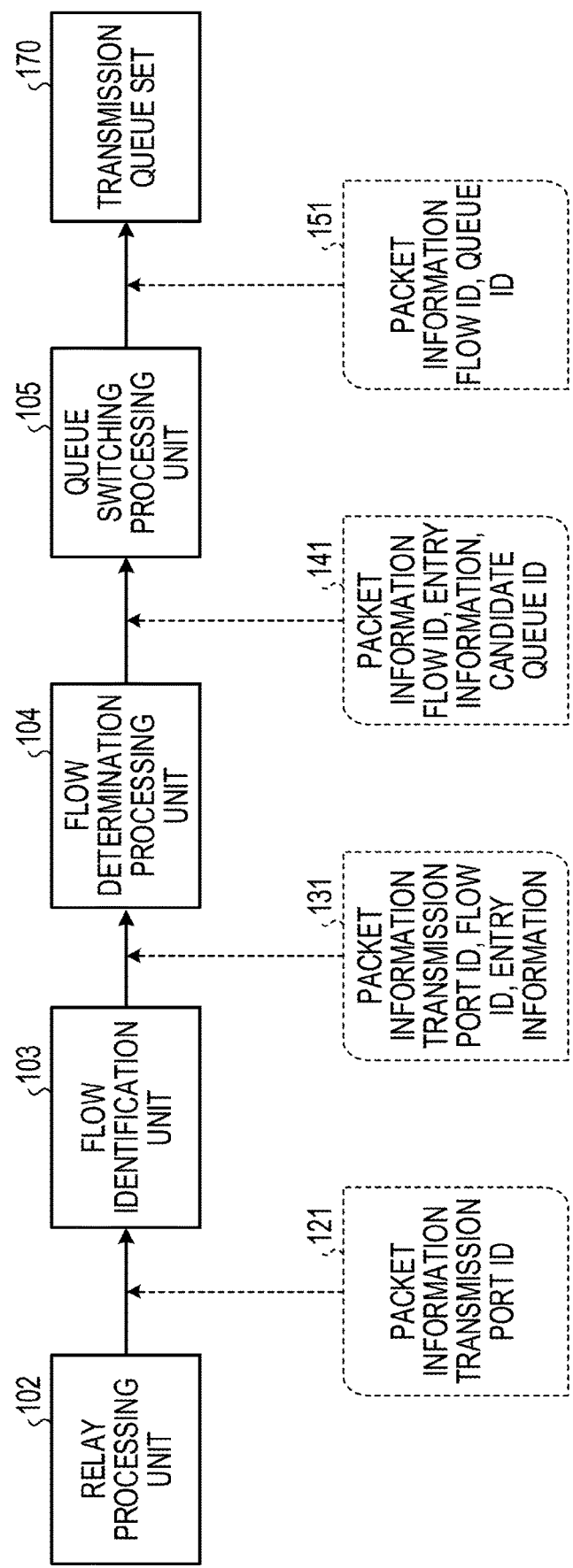
FIG. 3 is a diagram illustrating a combination of the information transmitted at each point between a relay processing unit and a transmission queue set.

FIG. 3 is a diagram illustrating a combination of the information transmitted at each point between the relay processing unit and the transmission queue set. As illustrated in FIG. 3, an information set 121 including the packet information and the transmission port ID is transmitted as control information of packet transmission performed from the relay processing unit 102 to the flow identification unit 103.

Descriptions will be made by referring back to FIG. 2. The flow identification table 161 is, for example, a table illustrated in FIG. 4. FIG. 4 is a diagram illustrating an example of the flow identification table.

The flow identification table 161 is registered in association with header information including the transmission source IP, the reception destination IP, the transmission source port number, the reception destination port number, and the protocol, addresses, and frequency information. The frequency information represents the frequency at which packets included in each flow at a certain time point are sent. Further, as will be described later, the address of the flow identification table 161 corresponds to the flow ID.

The flow identification table 161 according to the present embodiment is a content addressable memory (CAM) that gives the contents of information, thereby assigning the address of the entry in which the information is stored.

The flow identification unit 103 acquires the information set 121 including the packet information and the transmission port ID. Further, the flow identification unit 103 receives an input of a packet body. Next, the flow identification unit 103 searches for the flow identification table 161 by using header information including the transmission source IP, the reception destination IP, the transmission source port number, the reception destination port number, and the protocol which are included in the acquired packet information.

When there is an entry matching the header information, the flow identification unit 103 acquires an address corresponding to the header information as a flow ID which is identification information of the flow indicated by the header information. The flow ID is an identifier of the flow to which the acquired packet belongs. Further, the flow identification unit 103 increments the frequency information corresponding to the flow ID by one. Further, the flow identification unit 103 sets a message of "Found" indicating that a matching entry exists as entry information indicating the search result of the entry.

When there is no entry matching the header information and there is an empty space in the entry, the flow identification unit 103 registers the header information in the empty entry and registers 1 in the frequency information. Then, the flow identification unit 103 acquires the address of the registered entry as the flow ID corresponding to the header information. The flow ID is the identifier of the flow to which the acquired packet belongs. Further, the flow identification unit 103 sets a "New" message indicating that a new entry has been generated as entry information.

When there is no entry matching the header information and there is no empty space in the entry, the flow identification unit 103 sets a "Notfound" message indicating that there is no entry as entry information. In this case, the flow identification unit 103 may use the information indicating that the flow ID does not exist as the flow ID.

Thereafter, the flow identification unit 103 outputs the information set 131 including the packet information, the transmission port ID, the flow ID, and the entry information together with the packet body to the flow determination processing unit 104, as illustrated in FIG. 3.

Further, the flow identification unit 103 manages the entries of the flow identification table 161 at regular intervals. Specifically, the flow identification unit 103 stores in advance the cycle at which the entries of the flow identification table 161 are managed. When the management timing of the entries of the flow identification table 161 arrives, the flow identification unit 103 selects entries one by one from the flow identification table 161.

Then, the flow identification unit 103 determines whether the frequency information in the selected entry is 0. When it is determined that the frequency information is not 0, the flow identification unit 103 decrements the frequency information of the selected entry by one. That is, there is a high possibility that the packets output from the flow identification unit 103 have already been output from the transmission port 180 after a sufficient period has elapsed since they were output. Therefore, the flow identification unit 103 may predict the number of packets staying in the switch 100 which belongs to the flow by reducing the pieces of frequency information increased by one at the time of output by one. When it is determined that the frequency information is 0, it is possible to predict that a probability that the packet that belongs to the flow does not exist in the switch 100 is high.

Therefore, when it is determined that the frequency information is 0, the flow identification unit 103 acquires the value of the queue counter corresponding to the flow ID of the selected entry from the queue information management table 163. Then, the flow identification unit 103 determines whether the queue counter is 0. When it is determined that the queue counter is 0, since the flow identification unit 103 may confirm that no packet belonging to the flow remains in the transmission queue set 170, it is possible to predict that the packet belonging to the flow does not exist in the switch 100. Therefore, the flow identification unit 103 deletes the selected entry.

The flow identification unit 103 performs the above-described processing for all the entries in the flow identification table 161, and manages the flow identification table 161. As a result, unnecessary entries may be deleted, and the flow identification unit 103 may effectively use the flow identification table 161.

Figure 5:
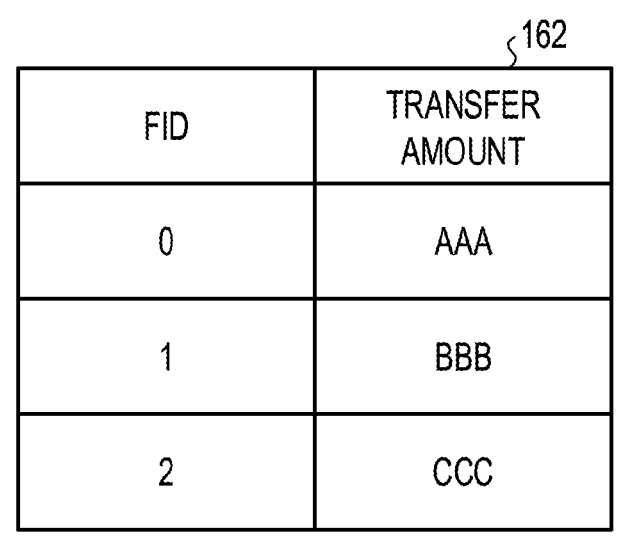

The transfer amount table 162 is a table illustrating the transfer amount of each flow. FIG. 5 is a diagram illustrating an example of the transfer amount table. As illustrated in FIG. 5, the transfer amount is registered in the transfer amount table 162 as the feature amount of each flow corresponding to the flow ID. In FIG. 5, FID represents a flow ID (flow ID). Further, in the case of the present embodiment, counters of all the transmission ports 180 are managed with one entry for one flow ID because most of the communications are unicast communications, and the number of the transmission ports 180 to be output destinations is limited to one. For this reason, even when all the transmission ports 180 are managed by one entry for one flow ID, it does not cause a problem in most cases.

The flow determination processing unit 104 receives the input of the information set 131 including the packet information, the transmission port ID, the flow ID, and the entry information from the flow identification unit 103 together with the packet body, as illustrated in FIG. 3. Then, the flow determination processing unit 104 confirms the acquired entry information.

When the entry information is "Found," the flow determination processing unit 104 specifies an entry corresponding to the flow ID acquired by the transfer amount table 162. Then, the flow determination processing unit 104 acquires the size of the packet from the packet information, adds the size of the packet to the transfer amount of the entry corresponding to the flow ID acquired by the transfer amount table 162, and records the result.

When the entry information is "New," the float determination processing unit 104 newly generates an entry corresponding to the flow ID in the transfer amount table 162. Then, the flow determination processing unit 104 initializes the transfer amount. Thereafter, the flow determination processing unit 104 acquires the size of the packet from the packet information, and records the size of the packet to the transfer amount of the generated entry.

Next, in a case where the entry information is "Found" or "New," the flow determination processing unit 104 checks the packet information and determines whether a specific queue is designated as the output queue of the packet. Here, the output queue refers to a queue that inputs and holds a packet and then output the packet held in the transmission port 180. For example, when the priority of a packet is high, a predefined specific queue to be processed preferentially is designated in the packet as an output queue.

When a specific queue is designated in the packet, the flow determination processing unit 104 uses the designated specific queue as a candidate queue to be designated as a candidate for the output queue. Specifically, the flow determination processing unit 104 confirms the priority of the packet stored in the packet information. For example, the priority of a packet is represented by 0 to 7. In this case, as the number becomes higher, the priority becomes higher. When the priority of the packet is 7, the flow determination processing unit 104 sets the specific queue to be processed preferentially as a candidate queue for the packet.

In the meantime, when a specific queue is not designated in the packet, the flow determination processing unit 104 determines whether the transfer amount is equal to or greater than a predetermined threshold value. When the transfer amount is equal to or greater than the predetermined threshold value, the flow determination processing unit 104 sets a long queue among a plurality of queues included in the transmission queue set 170 which is connected to the transmission port 181, as the candidate queue of the packet. A long queue refers to a queue that is allocated to store packets belonging to the flow having a large transfer amount and intended to increase the throughput. The transmission queue set 170 will be described later in detail.

In contrast, when the transfer amount is less than the predetermined threshold value, the flow determination processing unit 104 sets a short queue of a plurality of transmission queues included in the transmission queue set 170 which is connected to the transmission port 181, as the candidate queue of the queue. The short queue is a queue that is allocated to store packets belonging to flows having a small transfer amount and intended to lower the latency.

Meanwhile, when the entry is "Notfound," the flow determination processing unit 104 sets the default queue as the candidate queue of the packet.

Thereafter, the flow determination processing unit 104 outputs the information set 141 including the packet information, the flow ID, the entry information, and the candidate queue ID which is identification information of the candidate queue, as illustrated in FIG. 3, together with the packet body, to the queue switching processing unit 105.

The queue information management table 163 is a table that represents the information of the output queue of the packet of the flow and the state of the output queue for each flow for each flow. FIG. 6 is a diagram illustrating an example of the queue information management table. The queue information management table 163 stores the flow ID and a Q (Que) ID in association with each other. The Q ID represents the queue in which the packet of the flow having each flow ID is transmitted, that is, the current queue of the flow having each flow ID. Further, the queue information management table 163 includes a queue counter that indicates the number of packets of the flow stored in the current queue of the flow having each flow ID for each flow ID.

The queue switching processing unit 105 receives the input of the information set 141 including the packet information, the flow ID, the entry information, and the candidate Q ID together with the packet body from the flow determination processing unit 104. Then, the queue switching processing unit 105 confirms the entry information.

When the entry information is "Found," the queue switching processing unit 105 acquires the Q ID of the current queue of the acquired flow ID from the queue information management table 163. Then, the queue switching processing unit 105 determines whether switching of the queue occurs, depending on whether the candidate Q ID matches the Q ID of the current queue. When it is determined that switching of the queue does not occur, the queue switching processing unit 105 sets the output queue as a candidate queue. In this case, the output queue is maintained as the current queue.

Meanwhile, when it is determined that switching of the queue occurs, the queue switching processing unit 105 determines whether the value of the queue counter corresponding to the acquired flow ID in the queue information management table 163 is 0. When it is determined that the value of the queue counter is 0, it may be said that no packet of that flow remains in the current queue of that flow. That is, the queue switching processing unit 105 determines whether the packet of that flow remains in the current queue of that flow. When it is determined that the value of the queue counter is 0, since there is no packet remaining in the current queue, the queue switching processing unit 105 changes the output queue of the flow from the current queue to the candidate queue.

In contrast, when the value of the queue counter is not 0 and there are packets remaining in the current queue, the queue switching processing unit 105 maintains the output queue of the flow as the current queue which is not set as the candidate queue. As a result, it is possible to avoid storing packets in other queues even when the packets remain in a specific queue, and it is possible to avoid ordering of packets.

Further, when the entry information is "New," the queue switching processing unit 105 registers the newly acquired flow ID in the queue information management table 163, and generates a corresponding entry. The queue switching processing unit 105 initializes the queue counter value of the generated entry to 0. Then, the queue switching processing unit 105 sets the output queue of the flow as the candidate queue.

Further, when the entry information is "Notfound," the queue switching processing unit 105 sets the output queue of that flow as the candidate queue.

Thereafter, the queue switching processing unit 105 outputs the packet, the packet information, and the FID of the flow to which the packet belongs, to the transmission queue set 170 having the determined queue as the output queue of that flow. Along with the output of the packet, the queue switching processing unit 105 outputs the Q ID of the output queue of the output packet to the transmission queue set 170 of the output destination of the packet. The queue switching processing unit 105 outputs the flow ID of the flow to which the output packet belongs and the command instructing the addition to the queue information management table 163. As a result, the queue switching processing unit 105 increments the queue counter corresponding to the designated flow ID in the queue information management table 163 by one.

Figure 7:
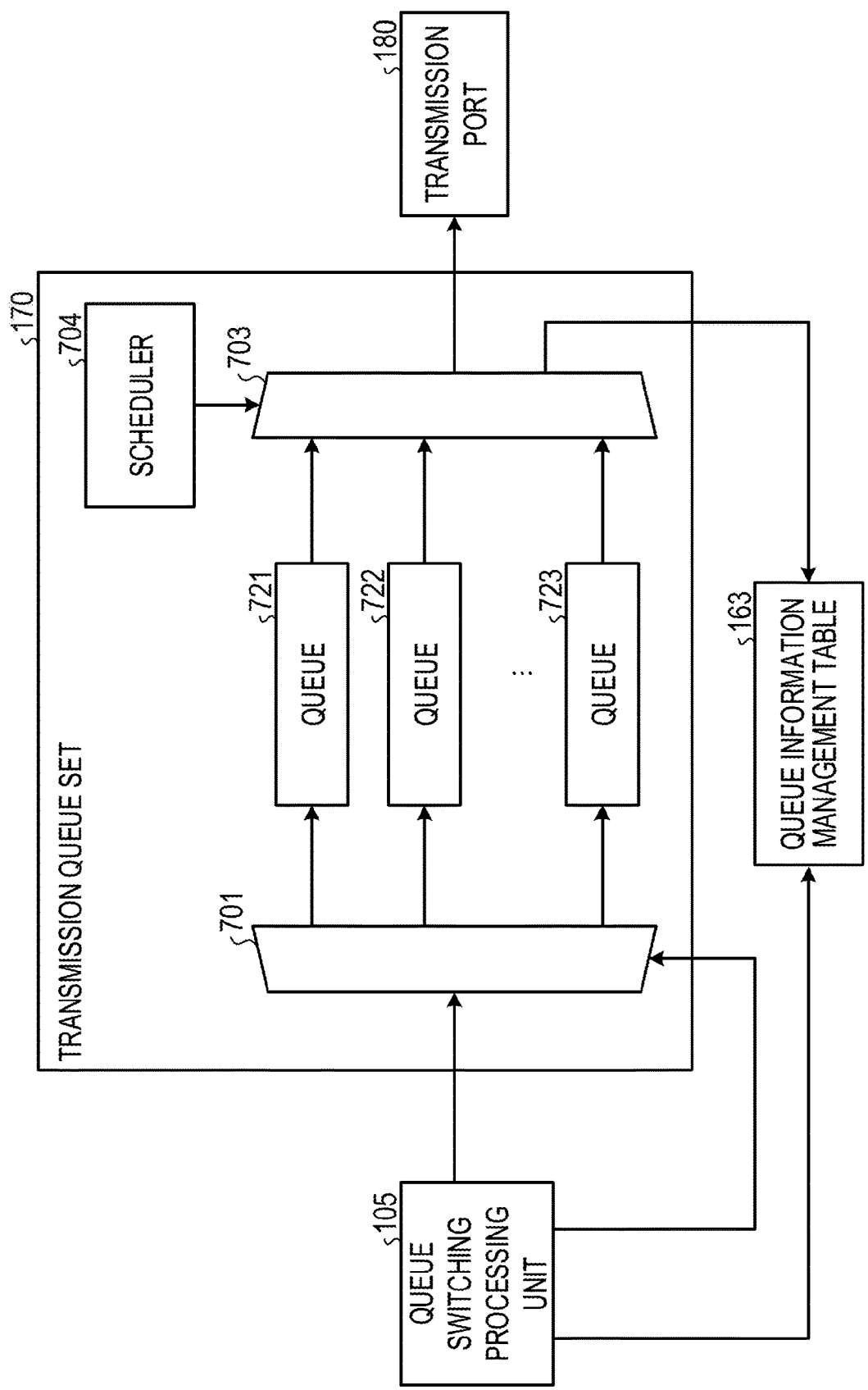
FIG. 7 is a block diagram of the transmission queue set.

FIG. 7 is a block diagram of the transmission queue set. As illustrated in FIG. 7, the transmission queue set 170 includes a selector 701, a multiplexer 703, a scheduler 704, and a plurality of queues 721 to 723. Hereinafter, each of the queues 721 to 723 is referred to as a "queue 720" unless the queues are distinguished from each other.

The selector 701 receives the input of the packet information, the flow ID, and the packet from the queue switching processing unit 105. Further, the selector 701 receives the input of the Q ID indicating the output queue of the packet from the queue switching processing unit 105. That is, the selector 701 receives the information set 151 including the packet information, the flow ID, and the Q ID, as illustrated in FIG. 3, and the input of the packet from the queue switching processing unit 105.

Then, the selector 701 outputs the packet information, the flow ID, and the packet to the queue 720 having the designated Q ID.

The queue 720 which is designated as an output queue with the Q ID input from the queue switching processing unit 105 receives the input of the packet information, the flow ID, and the packet from the selector 701. Then, the queue 720 stores the input packet information, flow ID, and packet. Thereafter, the queue 720 sequentially outputs the packet information, the flow ID, and the packet to be held in order of the acquisition timing to the multiplexer 703.

The scheduler 704 adjusts the packets output from the multiplexer 703. For example, the scheduler 704 selects a queue 720 that outputs a packet by a round robin, and outputs the queue 720 from the multiplexer 703.

The multiplexer 703 acquires the packet information, the flow ID, and the packet from the queue 720 designated by the scheduler 704. Then, the multiplexer 703 outputs the acquired packet information and packet to the transmission port 180. Further, the multiplexer 703 outputs the flow ID of the flow to which the packet belongs together with a command that instructs the subtraction, to the queue information management table 163. As a result, the transmission queue set 170 decrements the queue counter corresponding to the designated flow ID in the queue information management table 163 by one.

Descriptions will be made by referring back to FIG. 2. The transmission port 180 transmits the packet to the receiving side server 200 which is designated as the reception destination information included in the packet information.

Figure 8:
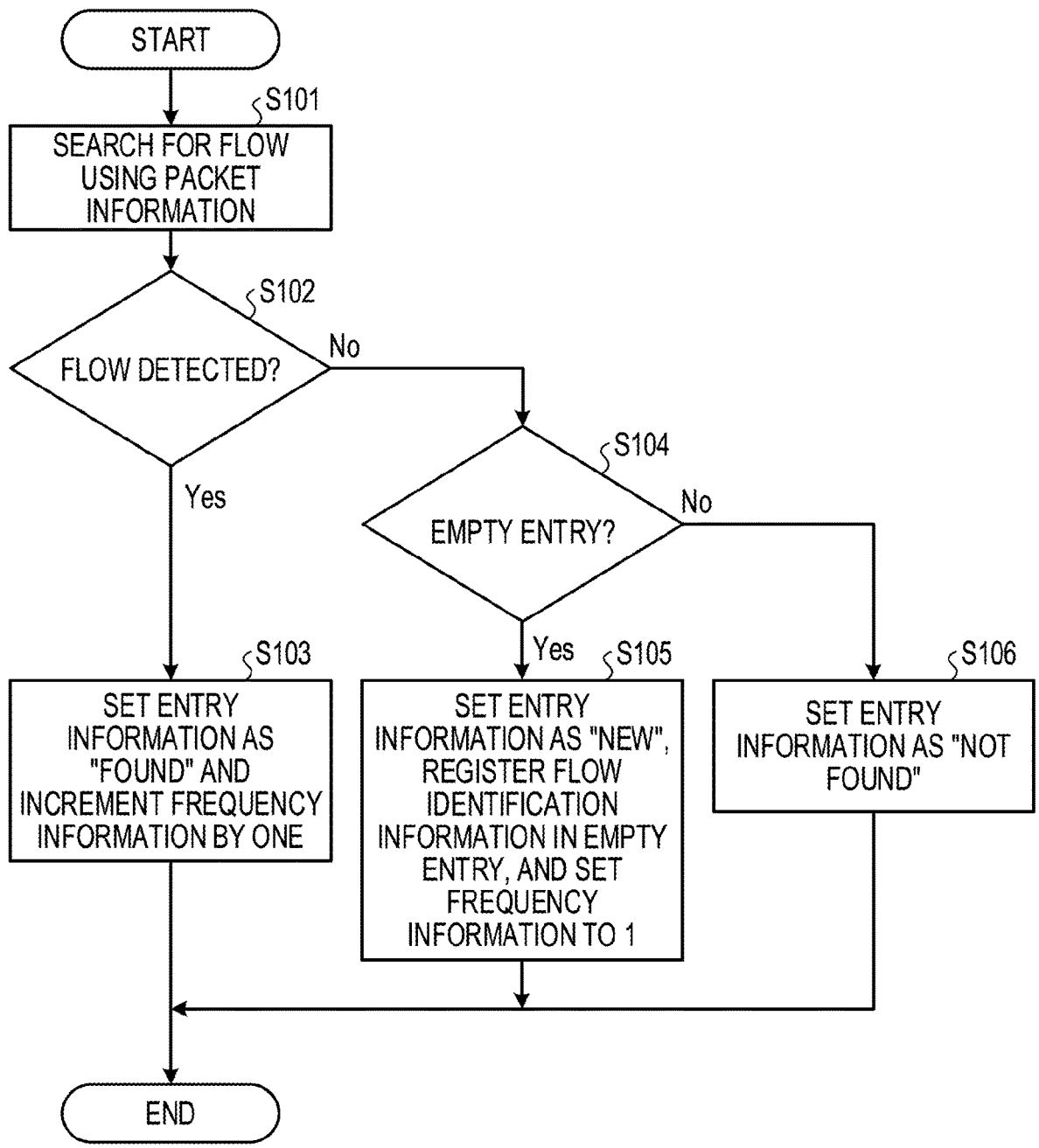
FIG. 8 is a flowchart of the flow identification processing by a flow identification unit.

Next, with reference to FIG. 8, a flow of the flow identification processing by the flow identification unit 103 will be described. FIG. 8 is a flowchart of the flow identification processing by the flow identification unit.

The flow identification unit 103 receives the input of the packet information and the transmission port ID together with the packet from the relay processing unit 102. Then, the flow identification unit 103 searches for the flow identification table 161 using the packet information (step S101). In the present embodiment, the flow identification unit 103 performs a search by outputting the transmission source IP, the reception destination IP, the transmission port number, the reception destination port number, and the protocol included in the packet information to the flow identification table 161.

Then, the flow identification unit 103 detects a flow corresponding to the flow to which the packet belongs (step S102). In the case of the present embodiment, since the flow identification table 161 is a CAM, when there is an entry having information corresponding to the transmitted information, the flow identification unit 103 acquires the flow ID corresponding to the entry from the flow identification table 161. Then, when the flow ID may be acquired, the flow identification unit 103 determines that the corresponding flow has been detected.

When it is determined that the corresponding flow has been detected ("Yes" in step S102), the flow identification unit 103 sets the entry information of the packet to "Found." Further, the flow identification unit 103 increments the frequency information corresponding to the flow ID in the flow identification table 161 by one (step S103).

In contrast, when it is determined that the corresponding flow has not been detected ("No" in step S102), the flow identification unit 103 determines whether there is an empty entry in the flow identification table 161 (step S104).

When it is determined that there is an empty entry ("Yes" in step S104), the flow identification unit 103 sets the entry information of the packet to "New." Further, the flow identification unit 103 registers the flow identification information in the empty entry of the flow identification table 161 and sets the frequency information to 1 (step S105). Then, the flow identification unit 103 acquires the identification information of the registered empty entry as the flow ID.

In contrast, when it is determined that there is no empty entry ("No" in step S104), the flow identification unit 103 sets the entry information of the packet as "Notfound" (step S106). In this case, the flow identification unit 103 acquires information indicating that the flow ID does not exist as the flow ID.

Figure 9:
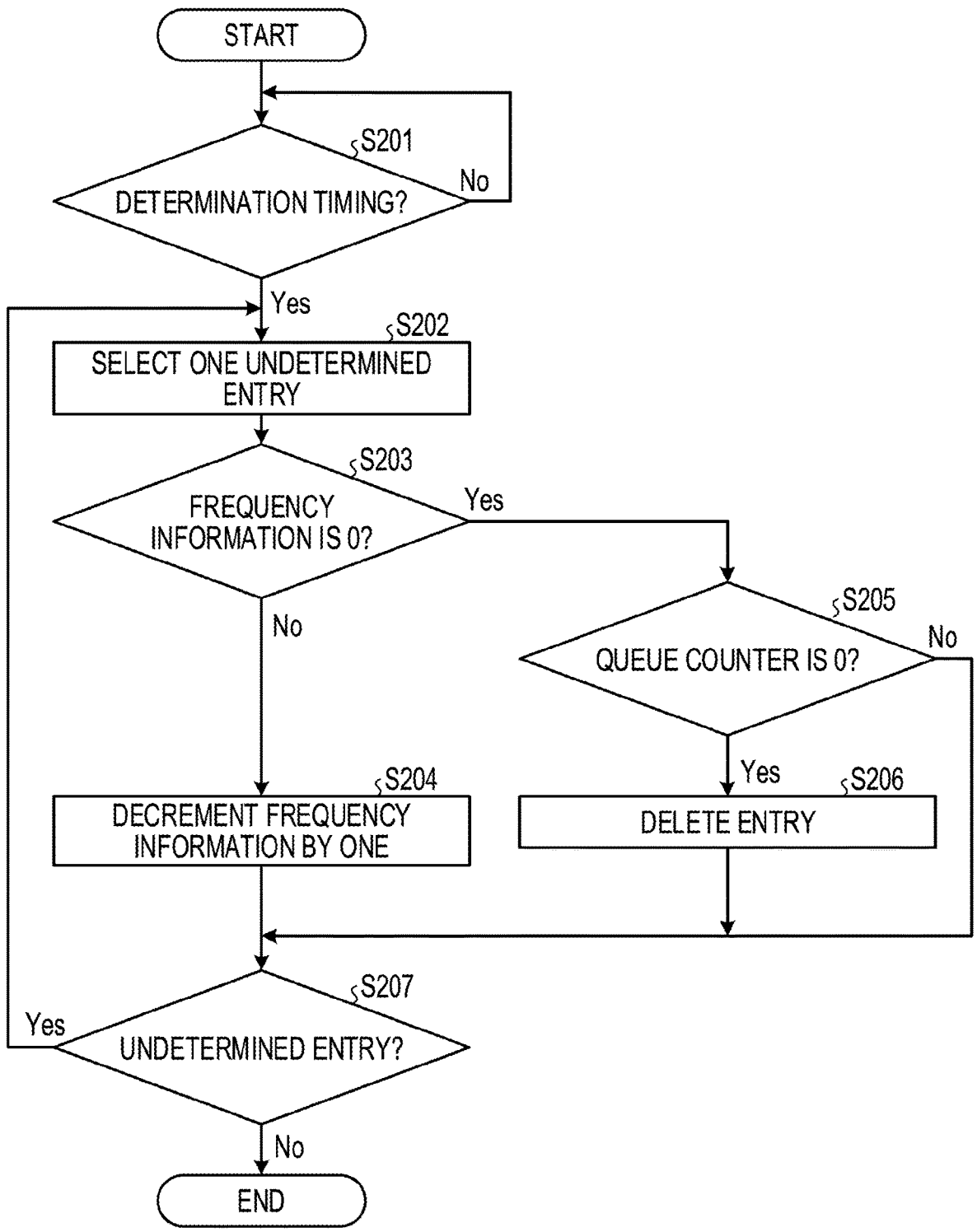
FIG. 9 is a flowchart of the entry management by the flow identification unit.

Next, with reference to FIG. 9, the flow of the entry management by the flow identification unit 103 will be described. FIG. 9 is a flowchart of the entry management by the flow identification unit.

The flow identification unit 103 determines whether the determination timing has arrived (step S201). When it is determined that the determination timing has not arrived ("No" in step S201), the flow identification unit 103 waits until the determination timing arrives.

In contrast, when it is determined that the determination timing has arrived ("Yes" in step S201), the flow identification unit 103 selects one undetermined entry from the flow identification table 161 (step S202).

Then, the flow identification unit 103 determines whether the frequency information in the selected entry is 0 (step S203). When it is determined that the frequency information is not 0 ("No" in step S203), the flow identification unit 103 decrements the frequency information of the selected entry by one (step S204).

In contrast, when it is determined that the frequency information is 0 ("Yes" in step S203), the flow identification unit 103 acquires the value of the queue counter corresponding to the flow ID of the selected entry from the queue information management table 163. Then, the flow identification unit 103 determines whether the queue counter is 0 (step S205).

When it is determined that the queue counter is 0 ("Yes" in step S205), the flow identification unit 103 deletes the selected entry (step S206). In contrast, when it is determined that the queue counter is not 0 ("No" in step S205), the flow identification unit 103 proceeds to step S207.

Thereafter, the flow identification unit 103 determines whether an undetermined entry remains (step S207). When it is determined that an undetermined entry remains ("Yes" in step S207), the flow identification unit 103 returns to step S202.

In contrast, when it is determined that an undetermined entry does not remain ("No" in step S207), the flow identification unit 103 ends the management processing of the entry.

Figure 10:
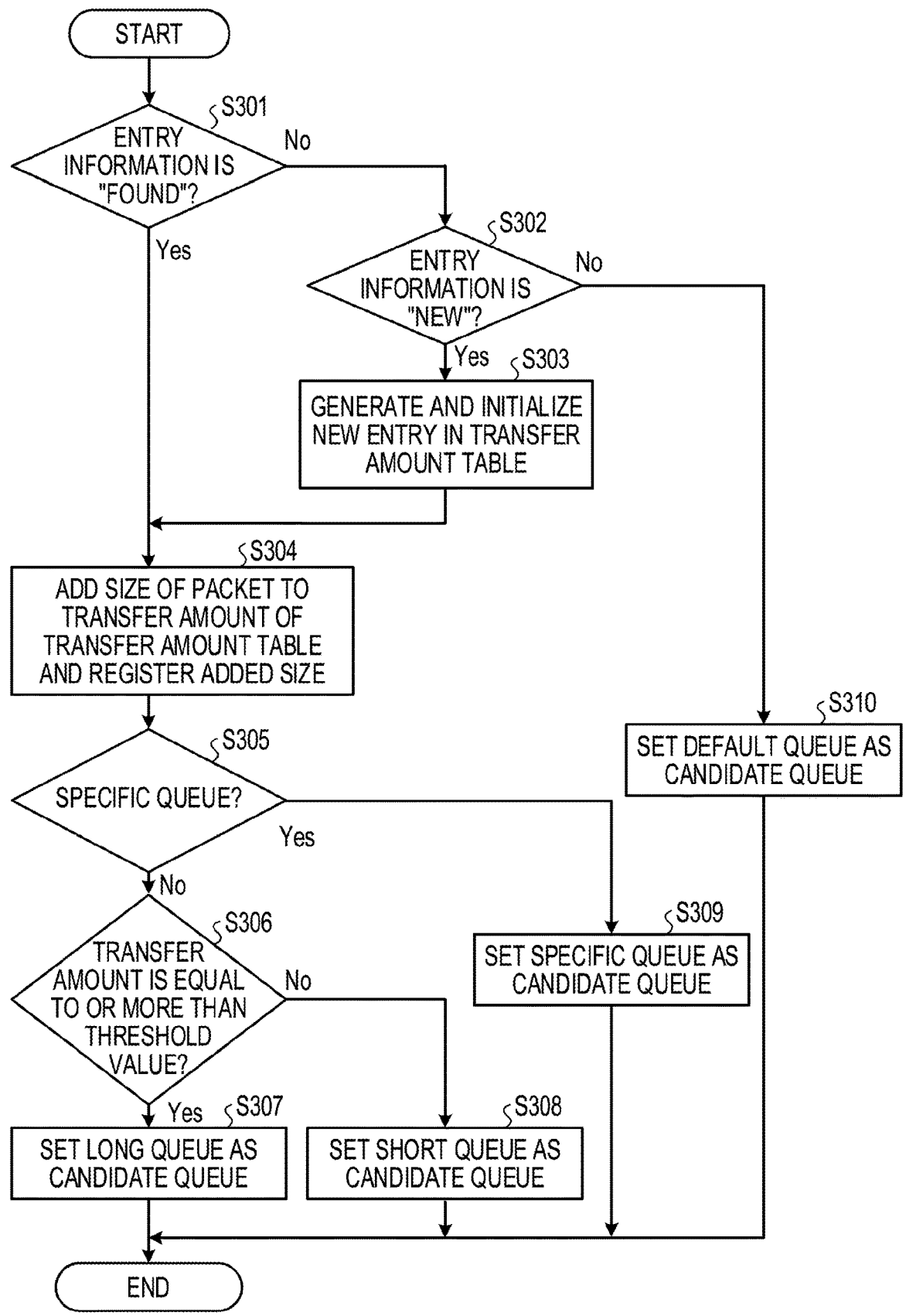
FIG. 10 is a flowchart of the flow determination processing by a flow determination processing unit.

Next, with reference to FIG. 10, the flow of the flow determination processing by the flow determination processing unit 104 will be described. FIG. 10 is a flowchart of the flow determination processing by the flow determination processing unit.

The flow determination processing unit 104 receives the input of the packet information, the transmission port ID, the flow ID, and the entry information from the flow identification unit 103. Then, the flow determination processing unit 104 determines whether the entry information is "Found" (step S301). When it is determined that the entry information is "Found" ("Yes" in step S301), the flow determination processing unit 104 proceeds to step S304.

In contrast, when it is determined that the entry information is not "Found" ("No" in step S301), the flow determination processing unit 104 determines whether the entry information is "New" (step S302).

When it is determined that the entry information is "New" ("Yes" in step S302), the flow determination processing unit 104 generates an entry corresponding to the newly acquired flow ID in the transfer amount table 162 and initializes the transfer amount (step S303).

After the entry information is "Found" or after step S303, the flow determination processing unit 104 adds the size of the acquired packet to the transfer amount of the transfer amount table 162 corresponding to the acquired flow ID and registers the size (S304).

Thereafter, the flow determination processing unit 104 determines whether the specific queue is designated as an output queue in the packet (step S305).

When it is determined that the specific queue is not designated ("No" in step S305), the flow determination processing unit 104 determines whether the transfer amount corresponding to the acquired flow ID is equal to or greater than the threshold value (step S306).

When it is determined that the transfer amount corresponding to the acquired flow ID is equal to or greater than the threshold value ("Yes" in step S306), the flow determination processing unit 104 sets a long queue as a candidate queue of the packet (step S307).

In contrast, when it is determined that the transfer amount corresponding to the acquired flow ID is less than the threshold value ("No" in step S306), the flow determination processing unit 104 sets a short queue as a candidate queue of the packet (step S308).

Meanwhile, when it is determined that the specific queue is designated ("Yes" in step S305), the flow determination processing unit 104 sets a specific queue as the candidate queue of the packet (step S309).

Further, when it is determined that the entry information is not "New" ("No" in step S302), that is, when the entry information is "Notfound," the flow determination processing unit 104 sets a default queue as the candidate queue of the packet (step S310).

Figure 11:
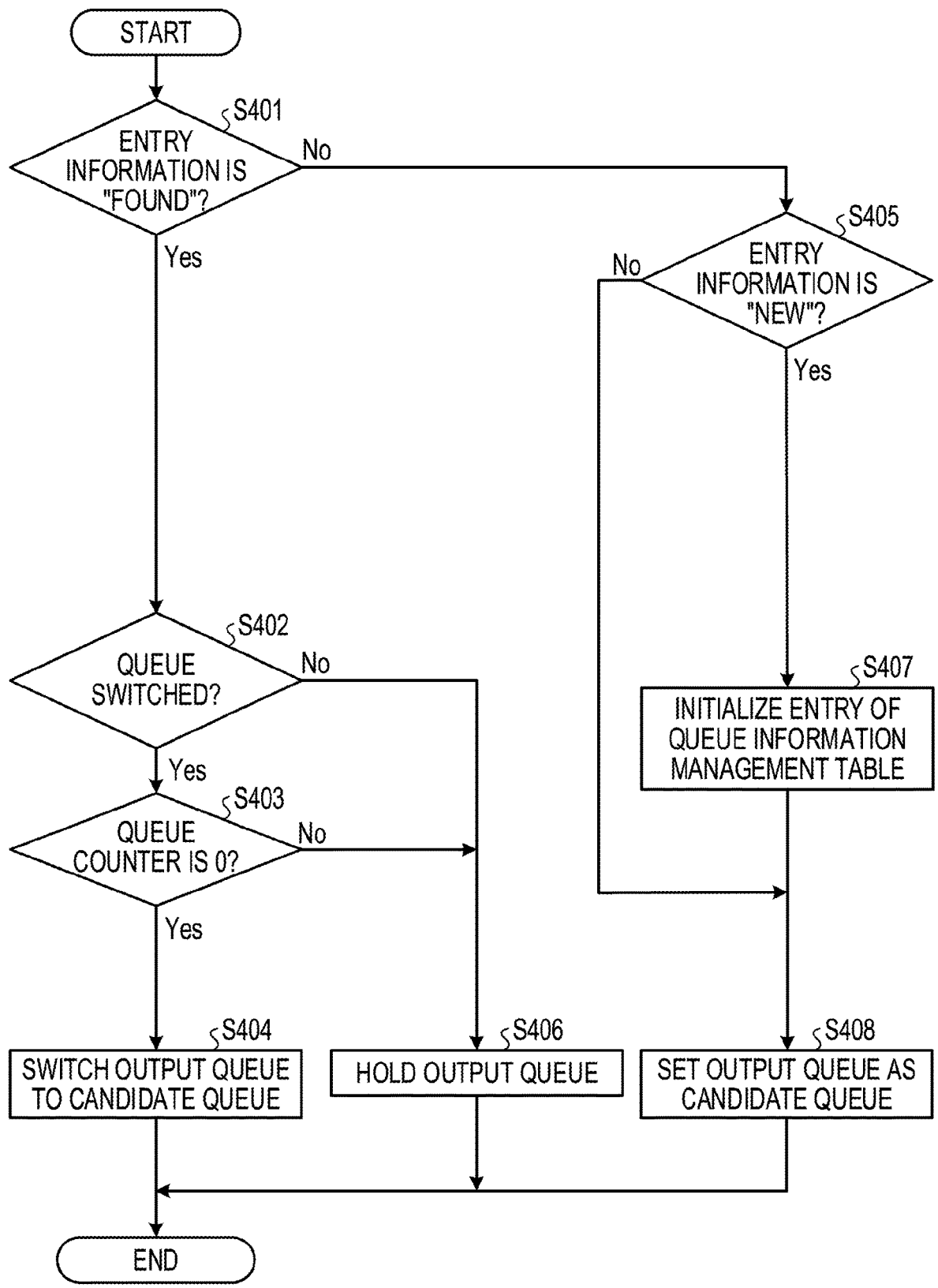
FIG. 11 is a flowchart of the queue switching processing by a queue switching processing unit.

Next, with reference to FIG. 11, the flow of the queue switching processing by the queue switching processing unit 105 will be described. FIG. 11 is a flowchart of the queue switching processing by the queue switching processing unit.

The queue switching processing unit 105 receives the input of the packet information, the flow ID, the entry information, and the candidate Q ID from the flow determination processing unit 104. Then, the queue switching processing unit 105 determines whether the entry information is "Found" (step S401).

When it is determined that the entry information is "Found" ("Yes" in step S401), the queue switching processing unit 105 determines whether switching of the queue occurs depending on whether the Q ID of the candidate queue and the Q ID of the current queue are the same (step S402).

When it is determined that the switching of the queue occurs ("Yes" in step S402), the queue switching processing unit 105 determines whether the value of the queue counter corresponding to the acquired flow ID in the queue information management table 163 is 0 (step S403).

When it is determined that the queue counter is 0 ("Yes" in step S403), the queue switching processing unit 105 switches the output queue of the packet to the candidate queue (step S404).

In contrast, when it is determined that the switching of the queue does not occur ("No" in step S402) and the queue counter is not 0 ("No" in step S403), the queue switching processing unit 105 maintains the output queue as the current queue (step S406).

Meanwhile, when it is determined that the entry information is not "Found" ("No" in step S401), the queue switching processing unit 105 determines whether the entry information is "New" (step S405). When it is determined that the entry information is not "New" ("No" in step S405), that is, when it is determined that the entry information is "Notfound," the queue switching processing unit 105 proceeds to step S408.

In contrast, when it is determined that the entry information is "New" ("Yes" in step S405), the queue switching processing unit 105 generates an entry corresponding to the acquired flow ID in the queue information management table 163, initializes the generated entry (step S407), and proceeds to step S408.

The queue switching processing unit 105 sets the output queue as the candidate queue (step S408).

Figure 12:
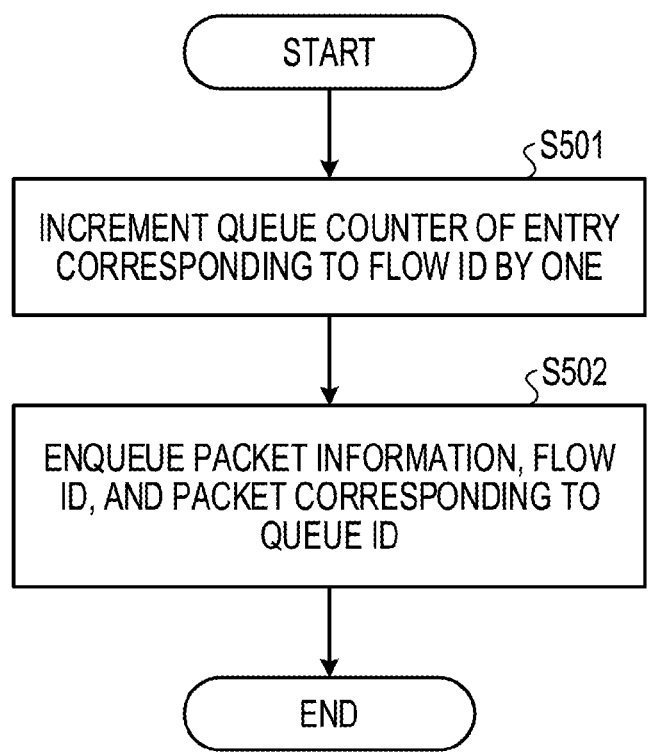
FIG. 12 is a flowchart of an enqueue processing for a queue.

Next, with reference to FIG. 12, the flow of the enqueue processing for the queue 720 will be described. FIG. 12 is a flowchart of the enqueue processing for the queue.

The queue switching processing unit 15 increments the queue counter of the entry of the queue information management table 163 corresponding to the flow ID to which the packet to be output belongs by one (step S501).

Next, the queue switching processing unit 15 enqueues the packet information, the flow ID, and the packet in the queue 720 corresponding to the Q ID (step S502).

Figure 13:
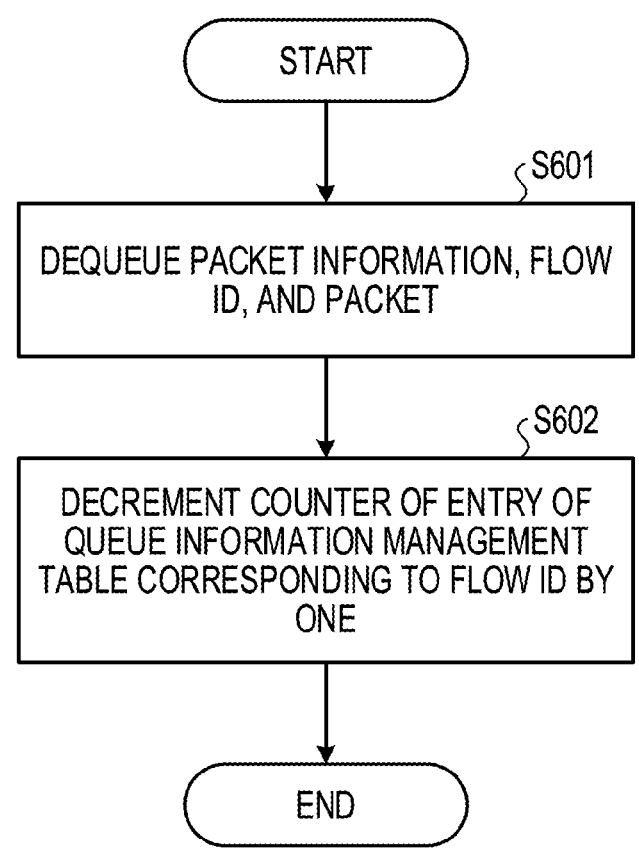
FIG. 13 is a flowchart of a dequeue processing for a queue.

Next, with reference to FIG. 13, the flow of the dequeue processing for the queue 720 will be described. FIG. 13 is a flowchart of the dequeue processing for the queue.

The queue 720 dequeues the packet information, the flow ID, and the packet, and outputs them to the transmission port 180 (step S601).

Thereafter, the queue 720 decrements the queue counter of the entry of the queue information management table 163 corresponding to the flow ID by one (step S602).

Here, in the present embodiment, descriptions have been made on a case where the transfer amount is used as the feature amount that determines the candidate queue, but other information may be used as the feature amount as long as the information may determine the type of the flow. For example, the increasing rate of the transfer amount which represents the increment of the transfer amount per unit time may be used as the feature amount. In this case, the flow determination processing unit 104 measures the increment of the transfer amount every fixed period, sets the long queue as the candidate queue when the measurement result is equal to or greater than a predetermined increment threshold value, and sets the short queue as the candidate queue when the measurement result is less than the increment threshold value.

Further, in the present embodiment, descriptions have been made on a case where the transmission destination of the packet is divided into two types of queues 720 such as a long queue and a short queue in addition to the specific queue. However, the number and type of the queue 720 are not limited to this, and any other number or type of queues 720 may be used as long as the classification according to the type of the flow is possible.

It may be considered a case, for example, where the flow identification unit 103 performs classification of storage traffic, streaming, and other flows as flow types using packet information. In this case, three types of queues 720 corresponding to storage traffic, streaming, and other flows are prepared in the queue 720. Then, the queue switching processing unit 105 determines the output queue of the packet according to the type of the flow determined by the flow determination processing unit 104.

It is also possible to combine the configurations of these queues. For example, six queues 720 may be prepared, that is, a specific queue that is a priority queue, a long queue and a short queue in storage traffic, a queue for streaming, and a long queue and a short queue in other traffic.

As described above, upon receiving a packet, the switch according to the present embodiment identifies the flow to which the packet belongs and determines the candidate of the output queue according to the feature amount related to the flow. Further, when no packet belonging to the flow remains in the candidate queue, the switch switches the output queue to the candidate queue and stores the packet in the output queue after switching. As a result, the switch according to the present embodiment may automatically and quickly determine the flow according to the feature amount of the flow, while keeping the order of the packets, and may dynamically and quickly switch the queue that stores the packet. Therefore, it is possible to switch the queue by the control at the flow level, so that the communication performance may be improved.

In particular, the switch according to the present embodiment may switch the output queue of the packet according to the transfer amount for each flow, and may separate the short packet and the long packet and store them in the queue. As a result, it is possible to separate a queue that requires low latency and a queue that requires a high throughput, and communication performance may be improved by selecting a queue according to characteristics of each flow.

Second Embodiment

Next, a second embodiment will be described. The switch according to the present embodiment is different from the first embodiment in that a table which performs a search using a hash value is used as the flow identification table. The switch according to the present embodiment is also represented by the block diagram of FIG. 2. In the following description, the description of the operation of each unit similar to the first embodiment will be omitted.

FIG. 14 is a diagram illustrating an example of the flow identification table according to the second embodiment. As illustrated in FIG. 14, in the flow identification table according to the present embodiment, header information is registered at an address corresponding to a hash value based on packet information. For example, in the present embodiment, a hash value obtained from a transmission source IP, a reception destination IP, a transmission source port, a reception destination port, and a protocol is used.

The flow identification unit 103 acquires a transmission source IP, a reception destination IP, a transmission source port, a reception destination port, and a protocol from the packet information acquired from the relay processing unit 102. Then, the flow identification unit 103 acquires a hash value from the acquired transmission source IP, reception destination IP, transmission source port, reception destination port, and protocol.

Next, the flow identification unit 103 reads the flow identification table 161 by taking the calculated hash value as an address. When the entry is in use and the header information of the read entry matches the header information of the packet, the flow identification unit 103 sets the entry information of the packet to "Found." In addition, the flow identification unit 103 acquires the address of the read entry, that is, the hash value as the flow ID. Further, the flow identification unit 103 increments the frequency information of the entry whose hash value is an address by one.

In contrast, when the entry having the hash value as an address is not in use, the flow identification unit 103 registers the header information of the packet in the empty entry and sets the frequency information to 1. Then, the flow identification unit 103 sets the entry information of the packet as "New."

In addition, when the entry having the hash value as an address is in use and the header information of the entry does not match the header information of the packet, the flow identification unit 103 determines whether the frequency information of the entry is 0. When it is determined that the frequency information is 0, the flow identification unit 103 acquires the value of the queue counter of the flow ID corresponding to the entry from the queue information management table 163. Then, when the queue counter is 0, the flow identification unit 103 registers the header information of the entry and sets the frequency information to 1. Further, the flow identification unit 103 sets the entry information of the packet to "New." When it is determined that the frequency information is not 0 or when it is determined that the frequency information is 0 but the queue counter is not 0, the flow identification unit 103 sets the entry information of the packet to "Notfound."

Concurrently with the operation described above, the flow identification unit 103 periodically scans the flow identification table 161 and decrements the frequency information of each entry by one by taking 0 as the minimum value in the same way as in the first embodiment.

Figure 15:
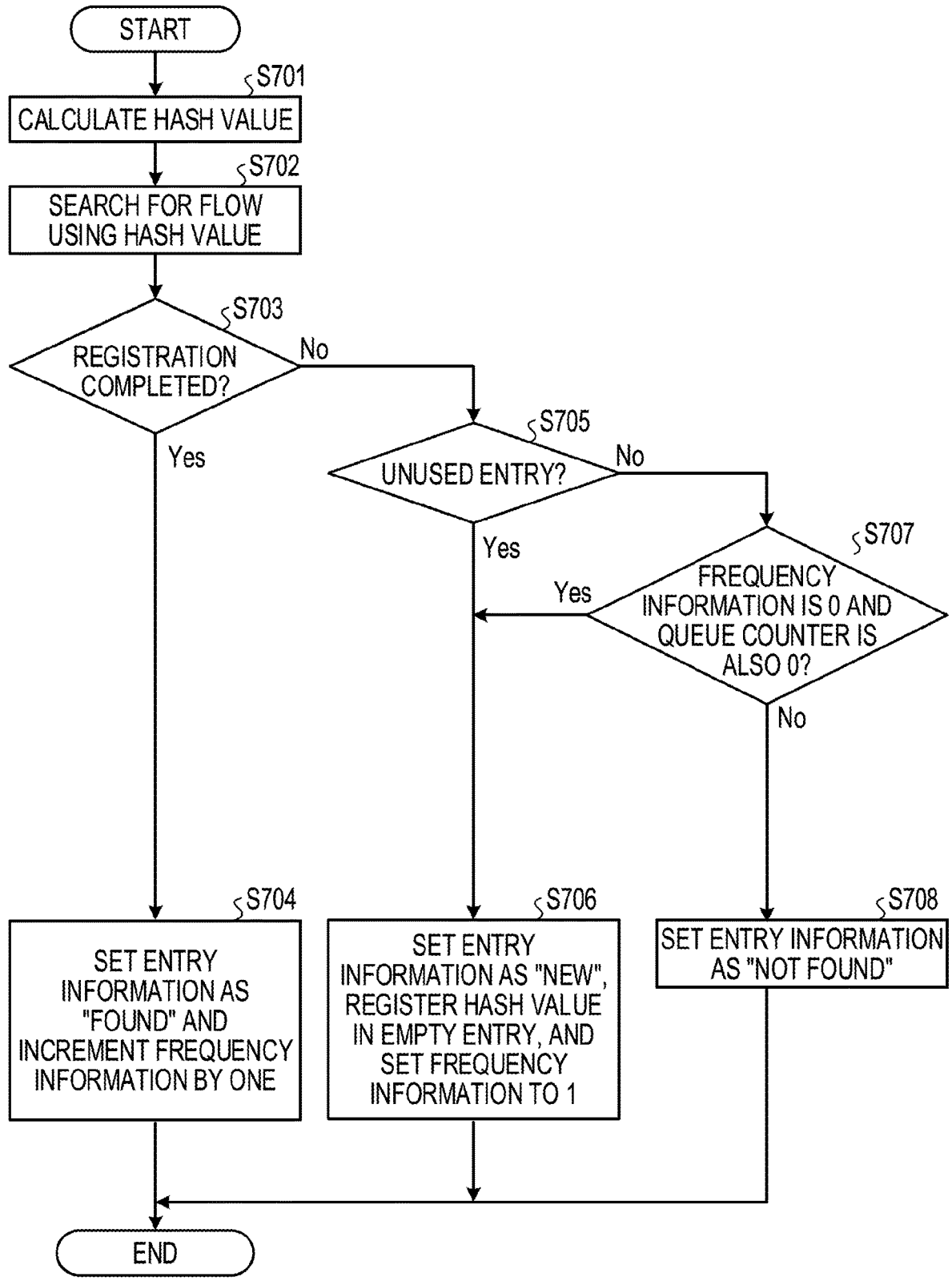
FIG. 15 is a flowchart of the flow identification processing by a flow identification unit according to the second embodiment.

Next, with reference to FIG. 15, a flow of the flow identification processing by the flow identification unit 103 according to the present embodiment will be described. FIG. 15 is a flowchart of the flow identification processing by the flow identification unit according to the second embodiment.

The flow identification unit 103 acquires a transmission source IP, a reception destination IP, a transmission source port, a reception destination port, and a protocol from the packet information acquired from the relay processing unit 102. Then, the flow identification unit 103 calculates a hash value from the acquired transmission source IP, reception destination IP, transmission source port, reception destination port, and protocol (step S701).

Next, the flow identification unit 103 searches for a flow from the flow identification table 161 using the calculated hash value (step S702).

Then, the flow identification unit 103 determines whether the flow corresponding to the flow to which the packet belongs is registered in the flow identification table (step S703).

When it is determined that the corresponding flow has been registered ("Yes" in step S703), the flow identification unit 103 sets the entry information as "Found" and increments the frequency information by one (step S704).

When it is determined that the corresponding flow has not been registered ("No" in step S703), the flow identification unit 103 reads the flow identification table 161 by taking the calculated hash value as an address and determines whether the read entry is an unused entry (step S705). When it is determined that the read entry is an unused entry ("Yes" in step S705), the flow identification unit 103 sets the entry information of the packet to "New." Further, the flow identification unit 103 registers a hash value in the empty entry and sets the frequency information of the entry to 1 (step S706).

In contrast, when the entry is in use ("No" in step S705), the flow identification unit 103 determines whether the frequency information is 0 and the queue counter is also 0 (step S707).

When it is determined that the frequency information is 0 and the queue counter is also 0 ("Yes" in step S707), the flow identification unit 103 sets the entry information of the packet to "New." Further, the flow identification unit 103 registers a hash value in the empty entry and sets the frequency information of the entry to 1 (step S706).

In contrast, when it is determined that the frequency information is not 0 or the queue counter is not 0 ("No" in step S707), the flow identification unit 103 sets the entry information of the packet to "Notfound" (step S708).

Concurrently with them, the flow identification unit 103 scans the flow identification table 161 and decrements the frequency information of each entry by one by taking 0 as the minimum value.

Here, in the present embodiment, descriptions have been made on a case where the flow identification unit 103 manages the flow identification table 161 each time there is no empty entry when receiving a packet. However, the management timing of the flow identification table 161 is not limited to this. For example, the flow identification unit 103 may repeat the management of the flow identification table 161 at regular intervals as in the first embodiment. Conversely, in the first embodiment, the flow identification table 161 may be managed at the timing described in the present embodiment.

As described above, the switch according to the present embodiment determines whether the flow to which the packet belongs has been registered by using the hash value. In this way, even when the flow is searched using the hash table without using the CAM, the switch may switch the queue by the control at the flow level, and the communication performance may be improved. In this case, since the flow identification table may be held in a normal large capacity memory, the circuit scale may be reduced and the power consumption may be suppressed as compared with the CAM.

Third Embodiment

Next, a third embodiment will be described. The switch according to the present embodiment is different from the first embodiment in that a queue information management table having different entries for each transmission port is used for each flow. The switch according to the present embodiment is also represented by the block diagram of FIG. 2. In the following description, the description of the operation of each unit similar to the first embodiment will be omitted.

FIG. 16 is a diagram illustrating an example of the queue information management table according to the third embodiment. In the queue information management table 163 according to the present embodiment, the entry corresponding to one flow ID is registered for each transmission port 180. FIG. 16 illustrates a state in which an entry corresponding to the transmission ports 181 and 182 is registered corresponding to each flow ID. However, in the queue information management table 163, it is sufficient that the transmission port 180 to which the queue 720 in use is connected as the current queue of the packet belonging to the flow ID is registered, and not all the transmission ports 181 and 182 may not be registered.

Using the queue information management table 163, the queue switching processing unit 105 manages the storage state of the packet for each transmission queue set 170 which is connected to each transmission port 180. Also, in this case, when the current queue and the candidate queue are different for each transmission port 180, and when the queue counter corresponding to the flow to which the packet belongs is 0, the queue switching processing unit 105 sets the candidate queue as the output queue.

In this way, the switch according to the present embodiment may control to switch the output queue for each transmission port by using a queue information management table having an entry for each transmission port for each flow. As a result, the switch according to the present embodiment may switch the queue at a more appropriate timing than in the case of the first embodiment, and the communication performance may be further improved.

Fifth Embodiment

Figure 17:
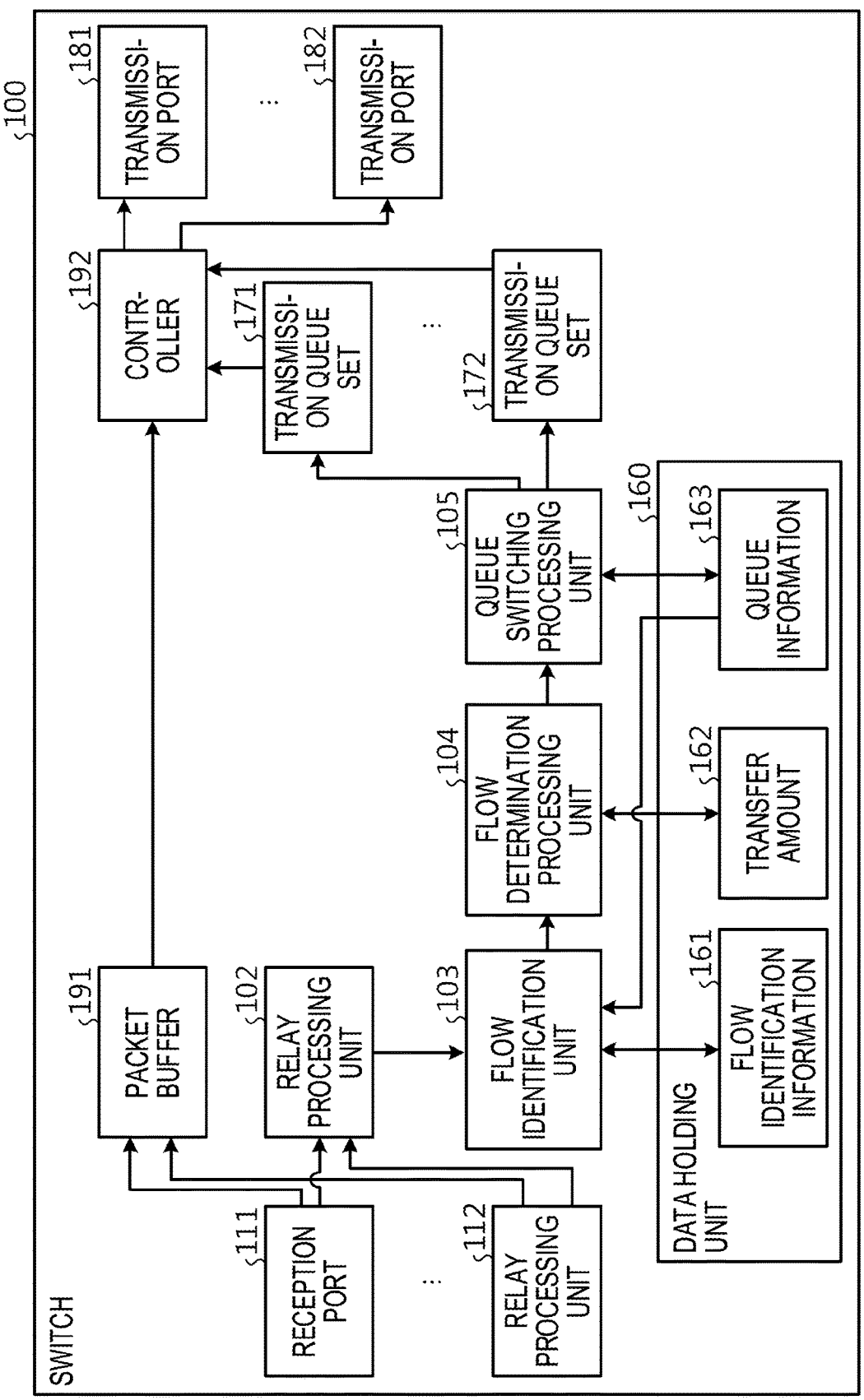
FIG. 17 is a block diagram of a switch according to a fourth embodiment.

FIG. 17 is a block diagram of the switch according to a fourth embodiment. The switch 100 according to the present embodiment is different from the first embodiment in that the packet body is not sent to the queue 720 but a pointer indicating the position of the packet is sent. In the following description, the description of the operation of each unit similar to the first embodiment will be omitted. The switch 100 according to the present embodiment includes a packet buffer 191 and a controller 192 in addition to the respective units of the first embodiment.

Upon receiving a packet, the reception port 110 stores the received packet in the packet buffer 191, and acquires a pointer indicating the storage location of the packet in the packet buffer 191. Then, the reception port 110 outputs the packet information to the relay processing unit 102 together with the pointer indicating the storage location of the packet.

The relay processing unit 102, the flow identification unit 103, the flow determination processing unit 104, and the queue switching processing unit 105, respectively, transmit a pointer indicating the storage location of the packet in place of the transmission of the packet body in the first embodiment.

Then, the packet information, the flow ID, and the pointer indicating the storage location of the packet are stored in the queue 720 which is set as the output queue in the transmission queue set 170.

The controller 192 receives, from the transmission queue set 170, the input of the packet information of a packet to be output and a pointer indicating the storage location of the packet. Then, the controller 192 acquires the packet body stored in the packet buffer 191 by using a pointer indicating the storage location of the packet. The controller 192 then outputs the packet information and the packet body together to the transmission port 180 corresponding to the transmission queue set 170 that outputs the packet.

As described above, the switch according to the present embodiment causes a pointer indicating the position of a packet to pass without passing through the queue, acquires the packet body according to the pointer output from the queue, and outputs the packet body. In this way, even when a processing is performed while the packet is stored in another place, the same effect as in the first embodiment may be obtained.

(Hardware Configuration)

Here, the switch 100 described in each of the above embodiments may be implemented by, for example, a large scale integration (LSI). For example, the data holding unit 160 and the transmission queue set 170 illustrated in FIGS. 2 and 17, and the packet buffer 191 illustrated in FIG. 17 are implemented by a storage device using the LSI. In addition, the storage device using the LSI stores various programs including programs which implement the functions of the relay processing unit 102, the flow identification unit 103, the flow determination processing unit 104, the queue switching processing unit 105, and the controller 192 illustrated in FIGS. 2 and 17.

Further, when the control circuit using the LSI reads and executes various programs from the storage device, thereby implementing the functions of the relay processing unit 102, the flow identification unit 103, the flow determination processing unit 104, the queue switching processing unit 105, and the controller 192. In particular, in the case of the switch 100 formed into an LSI, there are many cases having the mode illustrated in the fourth embodiment.

Fifth Embodiment

Techniques such as Non-Volatile Memory Express (registered trademark) over Fabric (NVMeoF) and Remote Direct Memory Access (RDMA) over Converged Ethernet (RoCE) are proposed as techniques that implement storage traffic with Ethernet (registered trademark). In the RoCE, a congestion control algorithm called a data center quantized congestion notification (DCQCN) is often used. Meanwhile, since there is a risk that communication performance may be degraded due to micro bursts where communication is concentrated in a short time, it is also required to deal with such a phenomenon.

In the related art, as a technique for congestion control in the network, a technique called a tail drop was used which discards a packet when the queue becomes full and reduces the transmission rate when discarding of the packet is detected. Thereafter, a congestion control technique in the network called an explicit congestion notification (ECN) has been used. The ECN is implemented by the following operation. The switch sets the threshold value of the queue in advance and marks the packet according to the length of the queue. The receiving side device detects the congestion by detecting the mark attached to the packet and notifies the transmitting side device of occurrence of congestion. The transmitting side device performs a control to lower the transmission rate upon receiving a notification of the occurrence of congestion.

Thereafter, a technique called Microburst Aware (MA)-ECN was proposed as a congestion control technique that suppresses microburst. In the MA-ECN, packets are transmitted to a queue having a small ECN threshold value at the initial point of the flow, and the influence on other flows is reduced by suppressing the throughput at the time of occurrence of microburst. In a transmission control protocol (TCP) communication, the MA-ECN suppressed the decrease in communication throughput even when microburst occurred.

However, in the RoCE, the communication throughput sometimes decreases even when the MA-ECN is used. This has the following reasons. In the DCQCN of the congestion control scheme used in the RoCE, a control is performed so that packets are transmitted at a high rate from the initial stage of the flow and the queue length is close to the threshold value. A relatively high communication rate is required, and a flow control technique called a PFC is used to suppress packet loss. In this case, when a microburst occurs at the start of the flow, the output from the short queue is not suppressed. As a result, many marks for ECN are added to the output packet from the long queue, and there is a possibility that the transfer rate of the flow using the long queue may be lowered. Therefore, in the configuration using the DCQCN, it is required not to lower the transfer rate even when the microburst occurs.

Figure 18:
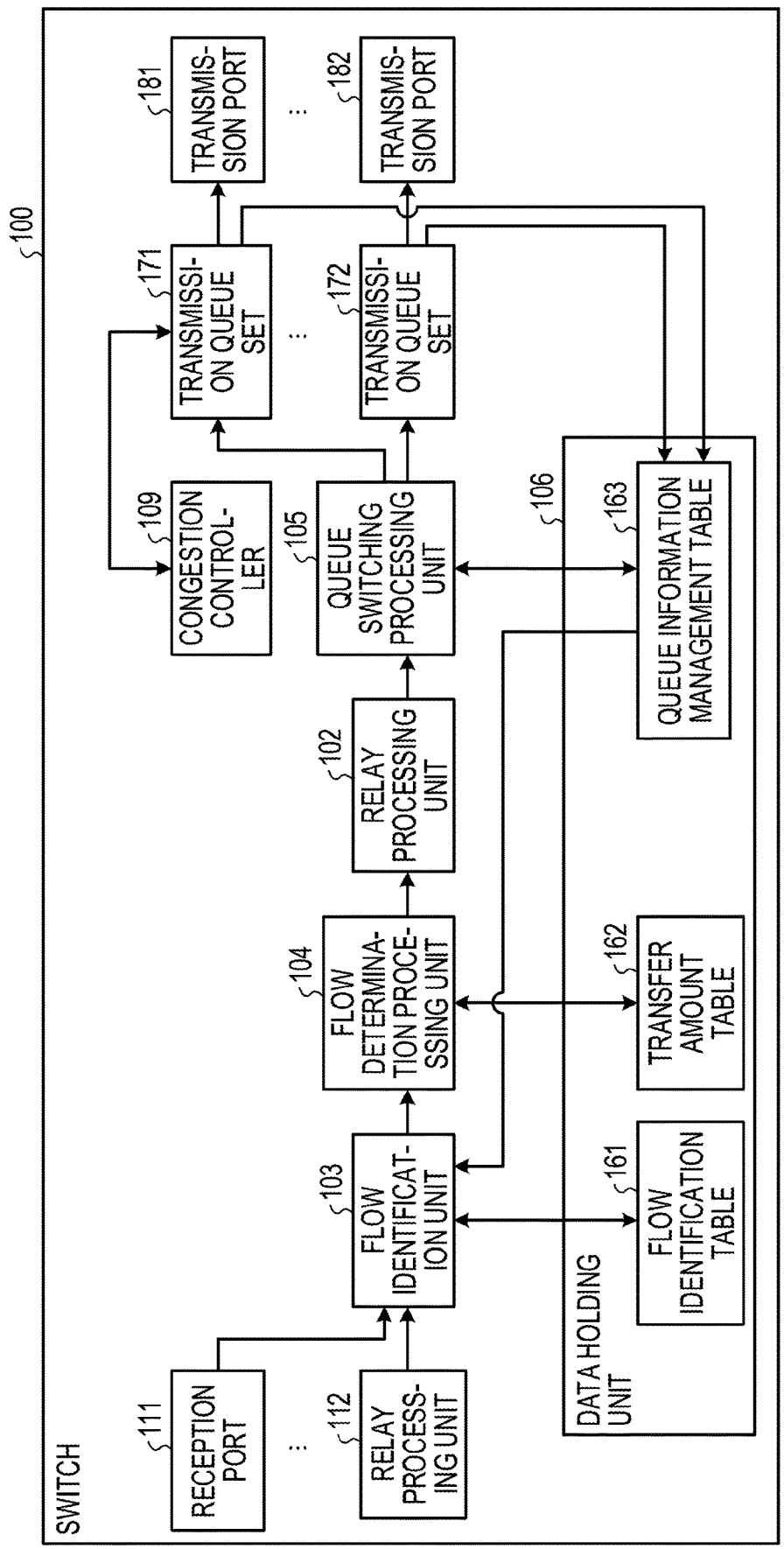
FIG. 18 is a block diagram of the switch that performs a congestion control.

FIG. 18 is a block diagram of the switch that performs a congestion control. The switch 100 according to the present embodiment is different from that in the first embodiment in terms of performing a bandwidth control of the short queue, and performing a congestion control and determining the congestion state of the long queue according to the queue length of the long queue to turn the packet to a long queue even when the packet is set as a candidate for the short queue unless in the congestion state. In the following description, descriptions of functions of the same units as those of the first embodiment will be omitted.

Here, in the present embodiment, as illustrated in FIG. 18, the relay processing unit 102 is arranged between the flow determination processing unit 104 and the queue switching processing unit 105. As a result, the determination processing of the transmission port 180 that outputs the packet is moved after the first embodiment, but there is almost no change other than the change of the processing position. That is, the relay processing unit 102 may be arranged in front of the flow identification unit 103 as in the first embodiment.

Figure 19:
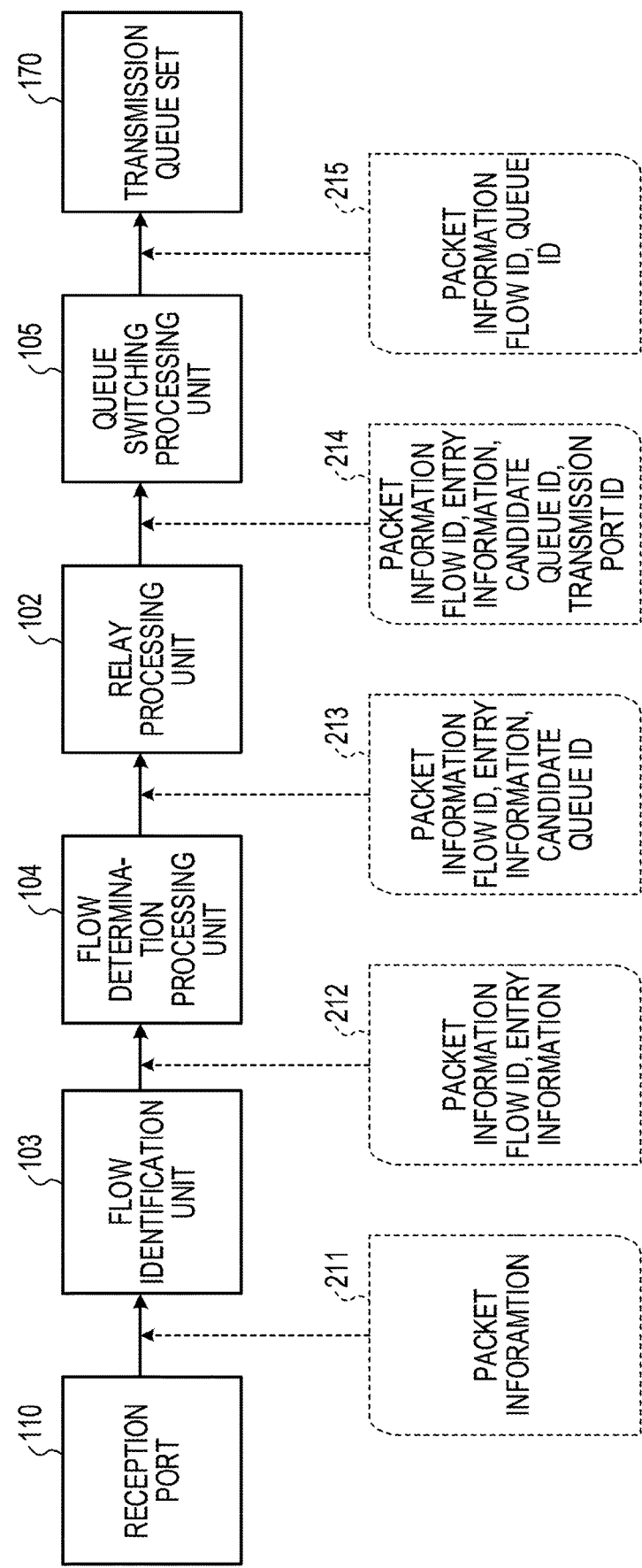
FIG. 19 is a diagram illustrating a combination of the information transmitted at each point of a switch according to a fifth embodiment.

The data exchanged between the respective units is illustrated in FIG. 19. FIG. 19 is a diagram illustrating a combination of the information transmitted at each point of the switch in the fifth embodiment. That is, an information set 211 including the packet information is transmitted as information transmitted from the reception port 110 to the flow identification unit 103. Further, an information set 212 including the packet information, the flow ID, and the entry information is transmitted as information transmitted from the flow identification unit 103 to the flow determination processing unit 104. An information set 213 including the packet information, the flow ID, the entry information, and the candidate Q ID is transmitted as information transmitted from the flow determination processing unit 104 to the relay processing unit 102. An information set 214 including the packet information, the flow ID, the entry information, the candidate Q ID, and the transmission port ID is transmitted as information transmitted from the relay processing unit 102 to the queue switching processing unit 105. Further, an information set 215 including the packet information, the flow ID, and the Q ID is transmitted as information transmitted from the queue switching processing unit 105 to the transmission queue set 170.

As illustrated in FIG. 20, the queue information management table 163 according to the present embodiment registers congestion information in addition to the FID, the QID, and the queue counter. FIG. 20 is a diagram illustrating an example of the queue information management table according to the fifth embodiment. The congestion information is information indicating whether congestion occurs in the queue 720 having the corresponding QID. In the present embodiment, all the ports are managed by one entry, but it is also possible to register an entry for each port in the queue information management table 163.

The queue switching processing unit 105 receives the input of the information set 214 including the packet information, the flow ID, the entry information, the candidate Q ID, and the transmission port ID together with the packet body from the relay processing unit 102. Then, the queue switching processing unit 105 confirms the entry information.

When the entry information is "Found," the queue switching processing unit 105 confirms the candidate Q ID and determines whether the candidate queue is a short queue. When it is determined that the candidate queue is a long queue, the queue switching processing unit 105 holds the candidate queue.

In contrast, when it is determined that the candidate queue is a short queue, the queue switching processing unit 105 confirms congestion information of each long queue in the queue information management table 163 and determines whether congestion has occurred in each long queue. When it is determined that no congestion has occurred, the queue switching processing unit 105 sets the candidate queue as a long queue. However, when it is determined that congestion has occurred, the queue switching processing unit 105 holds the candidate queue as a short queue.

That is, even when the candidate queue is a short queue, when there is no congestion in the long queue, the queue switching processing unit 105 outputs the packet to the long queue because the transfer rate of the long queue still has a margin. Meanwhile, when congestion has occurred, the queue switching processing unit 105 distributes the packets to the short queue in order to maintain the transfer rate of the long queue.

Thereafter, the queue switching processing unit 105 determines whether switching of the queue occurs. When it is determined that switching of the queue has not occurred, the queue switching processing unit 105 sets the output queue as a candidate queue. In this case, the output queue is held as the current queue.

In the meantime, when it is determined that switching of the queue has occurred, and when the value of the queue counter corresponding to the acquired flow ID in the queue information management table 163 is 0, the queue switching processing unit 105 changes the output queue of the flow from the current queue to the candidate queue.

In contrast, when the value of the queue counter is not 0, the queue switching processing unit 105 holds the output queue of the flow as the current queue that is not set as the candidate queue.

When the entry information is "New," the queue switching processing unit 105 registers the newly acquired flow ID in the queue information management table 163, and generates a corresponding entry. Then, the queue switching processing unit 105 sets the output queue of the flow as the candidate queue.

When the entry information is "Notfound," the queue switching processing unit 105 sets the output queue of the flow as the candidate queue.

Thereafter, the queue switching processing unit 105 outputs the packet, the packet information, and the FID of the flow to which the packet belongs to the transmission queue set 170 having the determined queue as the output queue of the flow. Along with the output of the packet, the queue switching processing unit 105 outputs the Q ID of the output queue of the output packet to the transmission queue set 170 of the output destination of the packet. The queue switching processing unit 105 outputs the flow ID of the flow to which the output packet belongs and the command instructing the addition to the queue information management table 163.

Figure 21:
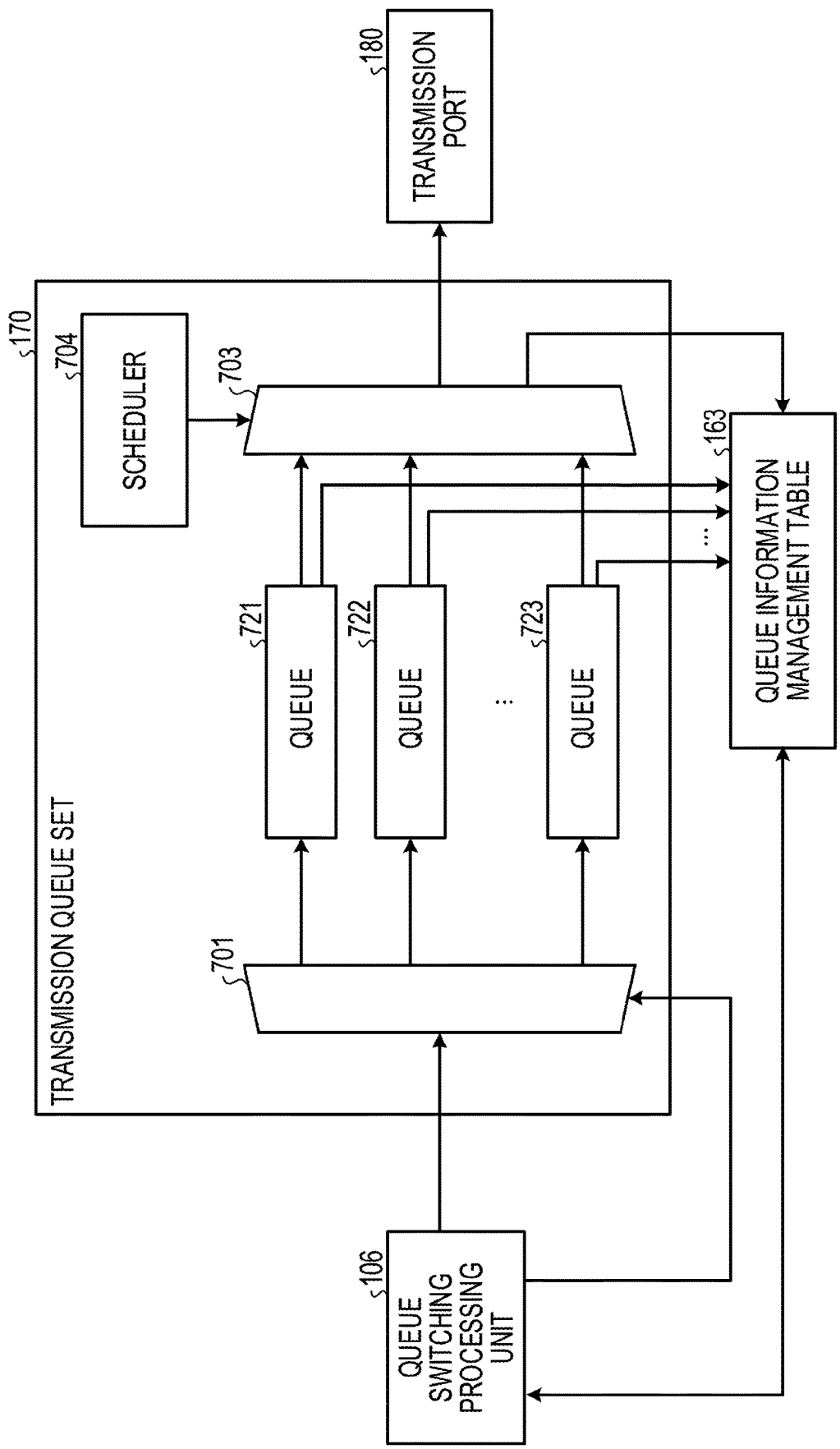
FIG. 21 is a block diagram of a transmission queue set according to the fifth embodiment.

FIG. 21 is a block diagram of the transmission queue set according to the fifth embodiment. As in the first embodiment, the transmission queue set 170 includes a selector 701, a multiplexer 703, a scheduler 704, and a plurality of queues 721 to 723.

The selector 701 receives the input of the packet information, the flow ID, and the packet from the queue switching processing unit 105. Further, the selector 701 receives the input of a Q ID indicating the output queue of the packet from the queue switching processing unit 105. Then, the selector 701 outputs the packet information, the flow ID, and the packet to the queue 720 having the designated Q ID.

The queue 720 which is designated as an output queue with the Q ID input from the queue switching processing unit 105 receives the input of the packet information, the flow ID, and the packet from the selector 701. Then, the queue 720 stores the input packet information, flow ID, and packet. Thereafter, the queue 720 sequentially outputs the packet information, the flow ID, and the packet to be held in order of the acquisition timing to the multiplexer 703. Further, the queue 720 compares its own queue length with a predetermined congestion threshold value, and registers the occurrence of congestion in the queue information management table 163 as congestion information when the queue length is equal to or greater than the threshold value. In contrast, when the queue length is less than the threshold value, the queue 720 registers the occurrence of no congestion as congestion information in the queue information management table 163.

The congestion controller 109 has a congestion determination threshold value, which is a queue length that determines congestion in each transmission queue set 171. Then, the congestion controller 109 acquires the queue length of each transmission queue set 171. FIG. 18 illustrates, for convenience of illustration, a communication path between the congestion controller 109 and the transmission queue set 171, but in actuality, the congestion controller 109 also has a communication path with another transmission queue set 170. When the queue length of a certain queue 700 exceeds the congestion determination threshold value, the congestion controller 109 adds a mark indicating the occurrence of congestion to the packet output from the queue 700. As the congestion controller 109 adds a mark, the server 200, which transmits and receives packets via the switch 100, may solve the congestion by controlling the transmission amount of the packet according to the mark.

The scheduler 704 has in advance a bandwidth designated value for each output bandwidth of each queue 720. Then, for each queue 720, the scheduler 704 calculates an output bandwidth which is the output data amount per unit time when the queue 720 is not empty. When the calculated output bandwidth is less than the bandwidth designated value for a certain queue 720, the scheduler 704 determines the output of the packet from the queue 720. Thereafter, the scheduler 704 adjusts the packets output from the multiplexer 703 to the plurality of queues 720 for which output has been determined.

The multiplexer 703 outputs the packet information and the packet to the transmission port 180 according to the designation from the scheduler 704. Further, the multiplexer 703 outputs the flow ID of the flow to which the packet belongs to the queue information management table 163 together with a command that instructs the subtraction.

Figure 22:
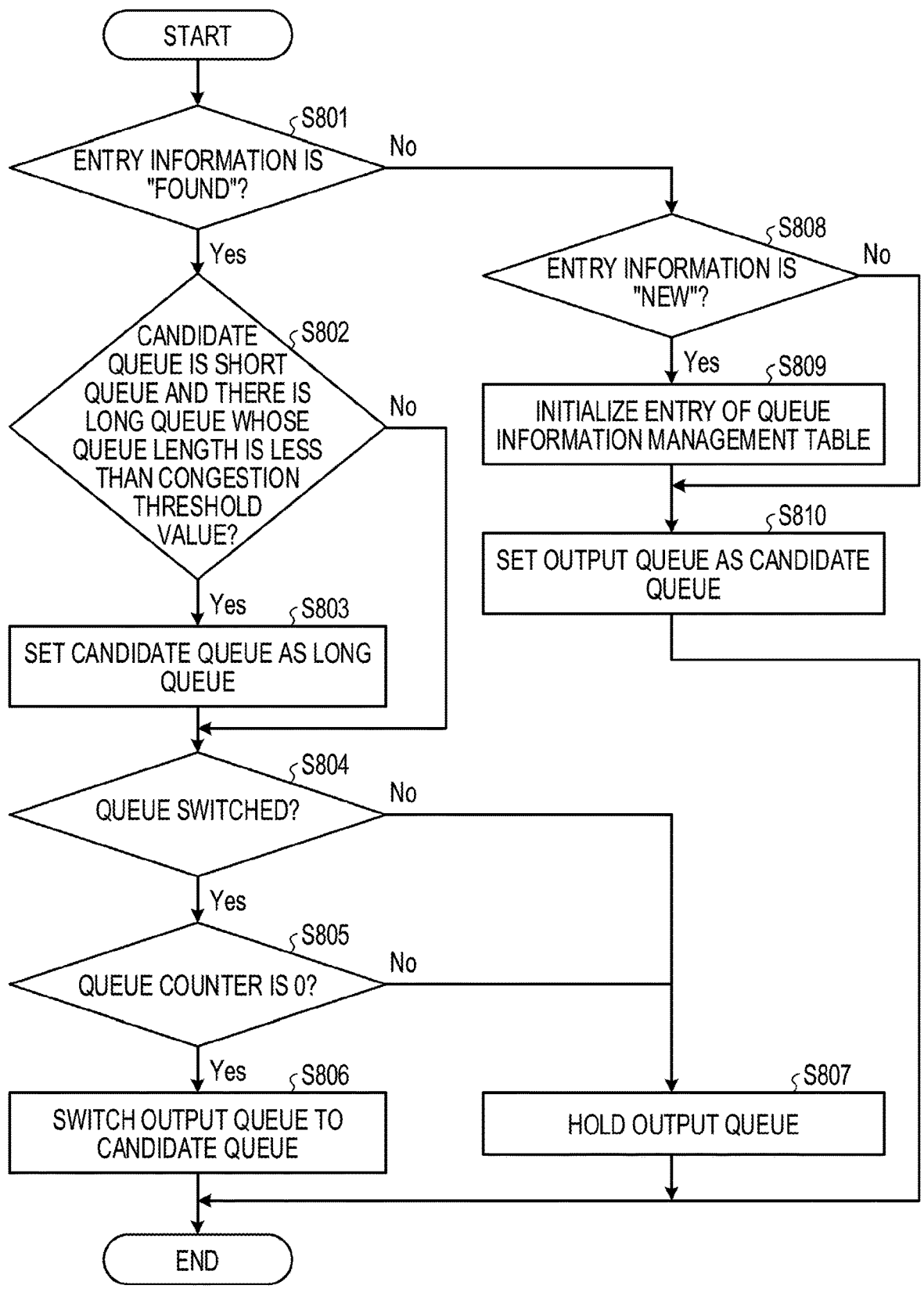
FIG. 22 is a flowchart of the queue switching processing by a queue switching processing unit according to the fifth embodiment.

Next, with reference to FIG. 22, the flow of the queue switching processing by the queue switching processing unit 105 according to the present embodiment will be described. FIG. 22 is a flowchart of the queue switching processing by the queue switching processing unit according to the fifth embodiment.

The queue switching processing unit 105 receives the input of the packet information, the flow ID, the entry information, the candidate Q ID, and the transmission port ID from the relay processing unit 102. Then, the queue switching processing unit 105 determines whether the entry information is "Found" (step S801).

When it is determined that the entry information is "Found" ("Yes" in step S801), the queue switching processing unit 105 determines whether the candidate queue is a short queue and there is a long queue where no congestion has occurred. Here, the long queue in which congestion has not occurred is a long queue whose queue length is less than the congestion threshold value (step S802). When it is determined that the candidate queue is a long queue or there is no long queue in which congestion has not occurred ("No" in step S802), the queue switching processing unit 105 proceeds to step S804.

When it is determined that the candidate queue is a short queue and there is a long queue in which congestion has not occurred ("Yes" in step S802), the queue switching processing unit 105 sets the long queue as a candidate queue (step S803).

Next, the queue switching processing unit 105 determines whether switching of the queue occurs depending on whether the candidate queue and the Q ID of the current queue are the same (step S804).

When it is determined that switching of the queue occurs ("Yes" in step S804), the queue switching processing unit 105 determines whether the value of the queue counter corresponding to the acquired flow ID in the queue information management table 163 is 0 (step S805).

When it is determined that the queue counter is 0 ("Yes" in step S805), the queue switching processing unit 105 switches the output queue of the packet to the candidate queue (step S806).

In contrast, when it is determined that switching of the queue does not occur ("No" in step S804) and the queue counter is not 0 ("No" in step S805), the queue switching processing unit 105 holds the output queue as the current queue (step S807).

Meanwhile, when it is determined that the entry information is "Found" ("No" in step S801), the queue switching processing unit 105 determines whether the entry information is "New" (step S808). When it is determined that the entry information is not "New" ("No" in step S808), that is, when it is determined that the entry information is "Not-found," the queue switching processing unit 105 proceeds to step S810.

In contrast, when it is determined that the entry information is "New" ("Yes" in step S808), the queue switching processing unit 105 initializes an entry obtained by generating an entry corresponding to the acquired flow ID in the queue information management table 163 (step S809), and proceeds to step S810.

The queue switching processing unit 105 sets the output queue as the candidate queue (step S810).

As described above, the switch according to the present embodiment determines whether to turn the packet for which the short queue is determined as the candidate queue to the long queue or to the short queue from the congestion state of the long queue. Thereafter, the switch determines a queue that outputs data so as to suppress the bandwidth to a predetermined bandwidth. As a result, the output rate of the long queue may be kept high, and it is possible to avoid occurrence of abrupt congestion control due to microburst or the like.

Sixth Embodiment

Next, a switch according to a sixth embodiment will be described. A block diagram of the switch according to the present embodiment is also illustrated in FIG. 18. The switch 100 according to the present embodiment is different from the fifth embodiment in terms of performing a congestion control and scheduling the queue 720 that outputs packets using a Deficit Round Robin (DRR). In the following description, descriptions of functions of the same units as those in the fifth embodiment are omitted.

The queue information management table 163 according to the present embodiment includes, for example, a format similar to that of FIG. 6. That is, the queue information management table 163 according to the present embodiment may not have congestion information. Also, in this case, the queue information management table 163 may have an entry for each port.

Then, the queue switching processing unit 105 according to the present embodiment performs the same processing as in the first embodiment, and determines an output queue of the packet included in each flow. That is, the queue switching processing unit 105 does not have to consider the congestion state of each queue 720 in determining the output queue.

Further, the transmission queue set 170 according to the present embodiment has the configuration illustrated in, for example, FIG. 7. That is, in the transmission queue set 170 according to the present embodiment, it is not necessary for the queue 721 to determine and register the congestion state in the queue information management table 163.

Then, the scheduler 704 uses the DRR algorithm to select the queue 720 which outputs the packet so that the output bandwidth of each queue 720 becomes a predefined ratio. Here, although the DDR algorithm is used in the present embodiment, the scheduler 704 may use other algorithms as long as they are algorithms of maintaining the output bandwidth of each queue, and for example, a Weighted Round Robin (WRR) or a Weighted Fair Queuing (WFQ) may be used.

As described above, in the switch according to the present embodiment, when there is no packet in the long queue, the bandwidth of the short queue is output without being restricted by the bandwidth control using the DRR. This makes it possible to maintain the performance of data transfer in both the long queue and the short queue.

Seventh Embodiment

Figure 23:
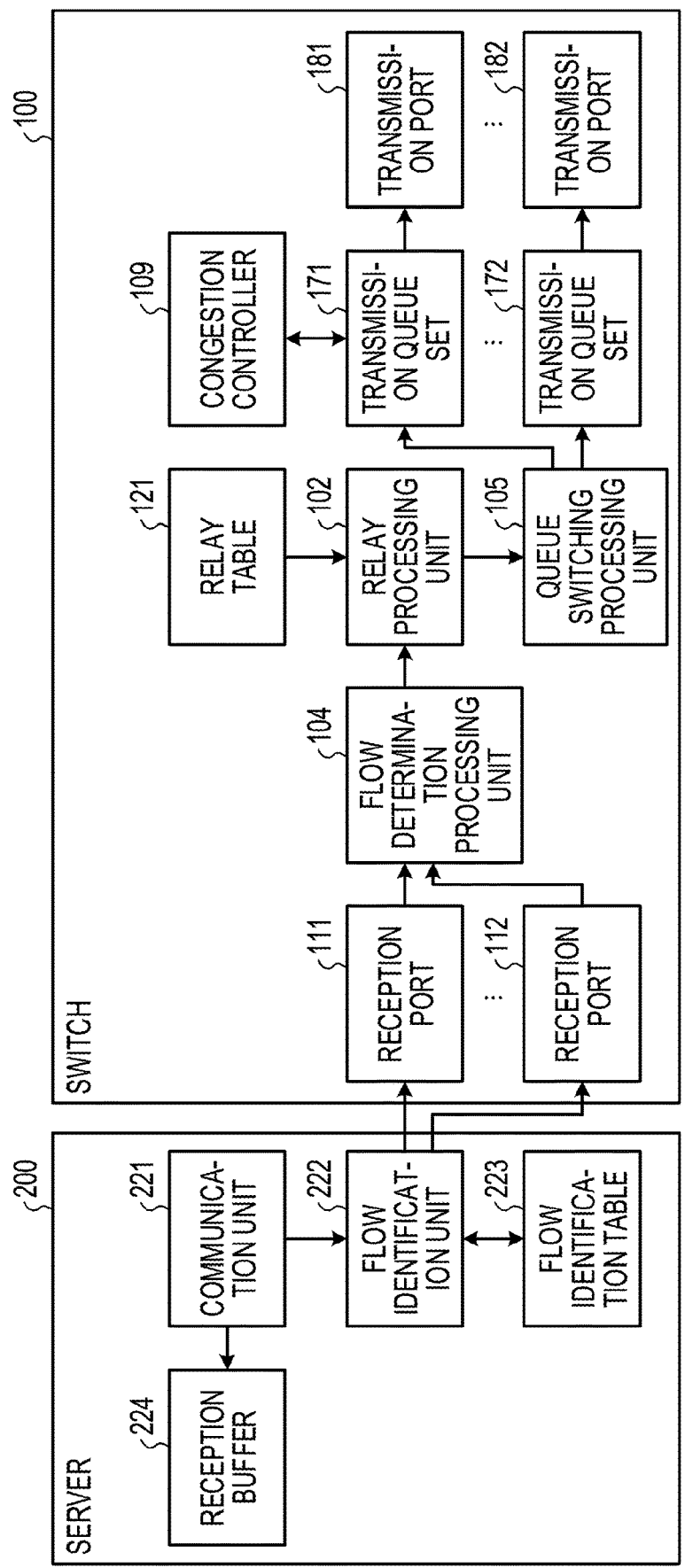
FIG. 23 is a block diagram of an information processing system according to a seventh embodiment.

FIG. 23 is a block diagram of the information processing system according to a seventh embodiment. The information processing system 1 according to the present embodiment is different from the sixth embodiment in that the server 200 performs a flow identification processing and a flow determination processing, and the switch 100 performs a queue switching processing. Each unit having the same reference numeral as that of the first embodiment has the same function unless otherwise specified.

The server 200 includes a communication unit 221, a flow determination unit 222, a flow determination table 223, and a reception buffer 224.

The communication unit 221 establishes a connection with a communication partner. Then, the communication unit 221 transmits and receives data and processes the flow. Upon transmitting data, the communication unit 221 outputs data to the flow determination unit 222.

Although not illustrated, the communication unit 221 is connected to the transmission port 181 of the switch 100. Then, the communication unit 221 receives the packet output from the transmission port 181. When an ACK (acknowledgment) is included in the received packet, the communication unit 221 executes a protocol processing for the ACK. Then, the communication unit 221 notifies the flow determination unit 222 of the reception of the ACK. Further, when data is included in the received packet, the communication unit 221 stores the data in the reception buffer 224. After completion of data transmission/reception, the communication unit 221 disconnects the connection.

Figure 24:
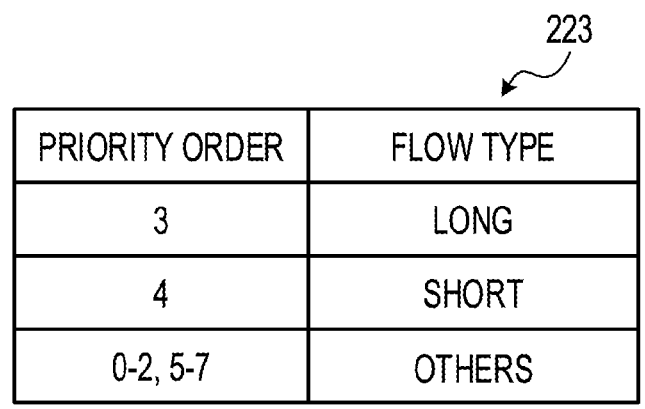
FIG. 24 is a diagram illustrating an example of a flow determination table.

The flow determination table 223 has, for example, information indicating a correspondence between the priority and the flow type as illustrated in FIG. 24. The priority is a value which is registered in the field of priority existing in the virtual local area network (VLAN) tag of the packet header. FIG. 24 is a diagram illustrating an example of the flow determination table. In the present embodiment, there are values of 0 to 7 as the priority. The flow type corresponding to the priority of value 3 is a "long" flow type that represents a flow having a large transfer amount. Also, the flow type corresponding to the priority of value 4 is a "short" flow type that represents a flow having a small transfer amount. Other flow types corresponding to priorities with values 0 to 2 and 5 to 7 represent "other" flow types.

When the establishment of a connection with the communication partner by the communication unit 221 is completed, the flow determination unit 222 initializes the information on the transmission amount of the flow held by itself and sets the information to 0. Next, the flow determination unit 222 acquires the packet to be transmitted from the communication unit 221. Next, the flow determination unit 222 determines whether the transmission amount of the flow is equal to or greater than a predetermined determination threshold value. When the transmission amount is less than the determination threshold value, the flow determination unit 222 acquires "3" which is a value representing the priority corresponding to the short flow from the flow determination table 223. Then, the flow determination unit 222 registers "3" in the priority field of the VLAN tag of the packet header.

In contrast, when the transmission amount is equal to or greater than the determination threshold value, the flow determination unit 222 determines whether the queue used at the previous transmission of the packet belonging to the flow is a short queue. When the long queue is used at the previous transmission, the flow determination unit 222 acquires "4" which is a value representing the priority corresponding to the long flow from the flow determination table 223. Then, the flow determination unit 222 registers "4" in the priority field of the VLAN tag of the packet header.

In contrast, when the short queue is used at the time of the previous transmission, the flow determination unit 222 determines whether a notification of the reception of the ACK for the previous packet transmission has been received from the communication unit 221. When it is determined that a notification of the reception of the ACK for the previous packet transmission has not been received from the communication unit 221, since there is a possibility that the packet may be stored in the queue 720, the flow determination unit 222 ends the packet transmission processing in order to suppress the overtaking of the packet.

In contrast, in the case of receiving the ACK reception notification from the communication unit 221 in response to the previous packet transmission, the flow determination unit 222 determines that there is no possibility that packets are stored in the queue 720. Next, the flow determination unit 222 acquires "4" which is a value representing the priority corresponding to the long flow from the flow determination table 223. Then, the flow determination unit 222 registers "4" in the priority field of the VLAN tag of the packet header.

The flow determination unit 222 then transmits the packet in which the value is set in the priority field to the switch 100. Further, the flow determination unit 222 adds the packet length to the transmission amount of the flow. Thereafter, the flow determination unit 222 proceeds to the processing of transmitting the next packet belonging to the flow.

The switch 100 includes a reception port 110, a relay processing unit 102, a queue switching processing unit 105, a congestion controller 109, a transmission queue set 170, a transmission port 180, and a relay table 121. The information of the transmission port 180 corresponding to the address is registered in the relay table 121. The information of the transmission port 180 includes, for example, the Q ID of the queue 700 that outputs a packet to the transmission port 180, and the identification information of the transmission port 180.

The reception port 110 receives, from the server 220, a packet in which the value is set in the priority field. Then, the reception port 110 outputs the received packet to the flow determination processing unit 104.

The flow determination processing unit 104 receives the input of a packet from the reception port 110. Then, the flow determination processing unit 104 acquires the value set in the priority field of the packet header. When the value set in the priority field is 3, the flow determination processing unit 104 sets the output queue of the packet as a long queue. Further, when the value set in the priority field is 4, the flow determination processing unit 104 sets the output queue of the packet as a short queue. Then, the queue switching processing unit 105 outputs the packet together with the designation information of the output queue to the relay processing unit 102.

The relay processing unit 102 receives the input of a packet together with the designation information of the output queue from the flow determination processing unit 104. Then, the relay processing unit 102 acquires the address of the reception destination from the packet header. Next, the relay processing unit 102 acquires the information of the transmission port 180 corresponding to the acquired address from the relay table 121. Thereafter, the relay processing unit 102 outputs the packet together with the information of the transmission port 180 which transmits the packet and the designation information of the output queue to the queue switching processing unit 105.

The queue switching processing unit 105 receives the input of a packet together with the information of the transmission port 180 and the designation information of the output queue from the relay processing unit 102. Then, the queue switching processing unit 105 stores the packet in the queue 720 according to the designation information of the output queue in the queue 720 in the transmission queue set 170 which is designated as the information of the transmission port 180.

Using the DRR algorithm, the scheduler 704 selects the queue 720 which outputs the packet so that the output bandwidth of each queue 720 becomes a predefined ratio. Although the DDR algorithm is used in the present embodiment, the scheduler 704 may use another algorithm as long as the algorithm maintains the output bandwidth of each queue, and may use, for example, a WRR or a WFQ. The multiplexer 703 acquires a packet from the queue 720 selected by the scheduler 704 and outputs the packet to the transmission port 180.

Figure 25:
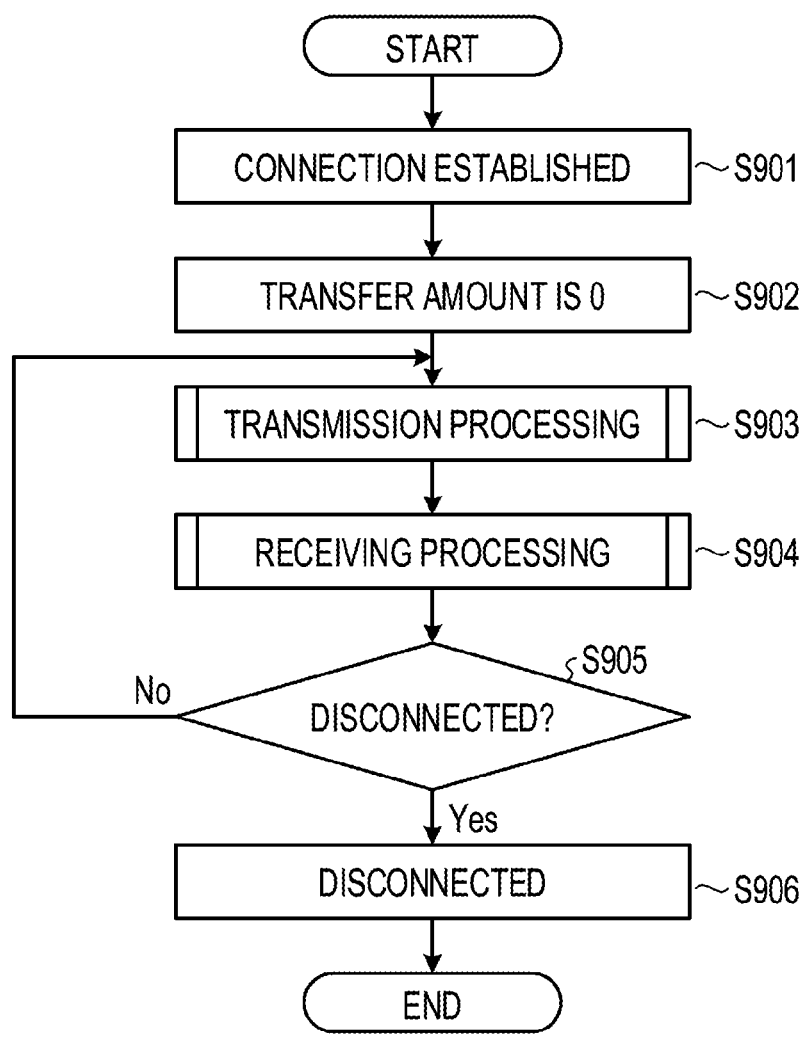
FIG. 25 is a flowchart of the entire processing of flow management by a server according to the seventh embodiment.
Figure 26:
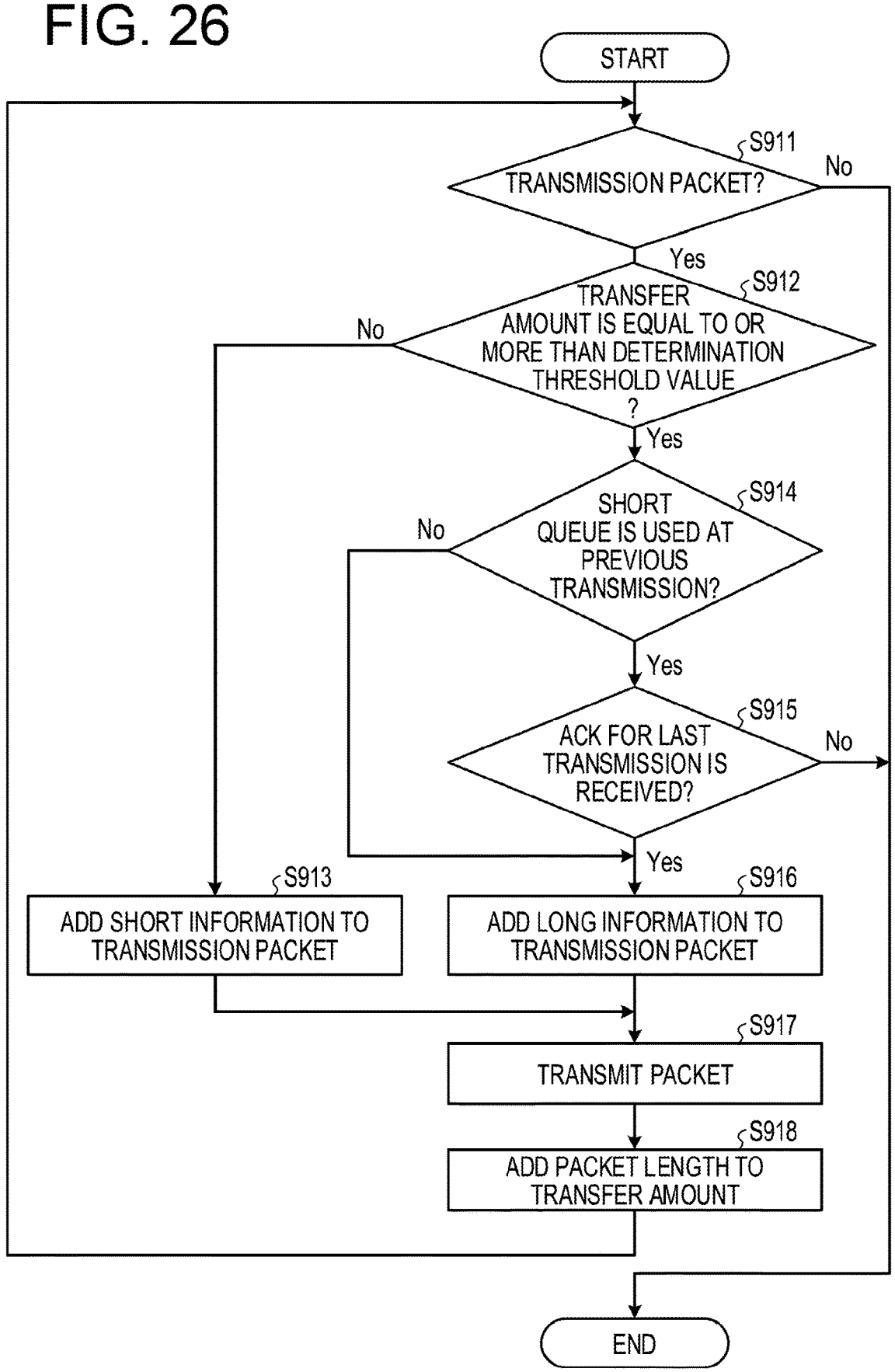
FIG. 26 is a flowchart of the transmission processing by the server according to the seventh embodiment.
Figure 27:
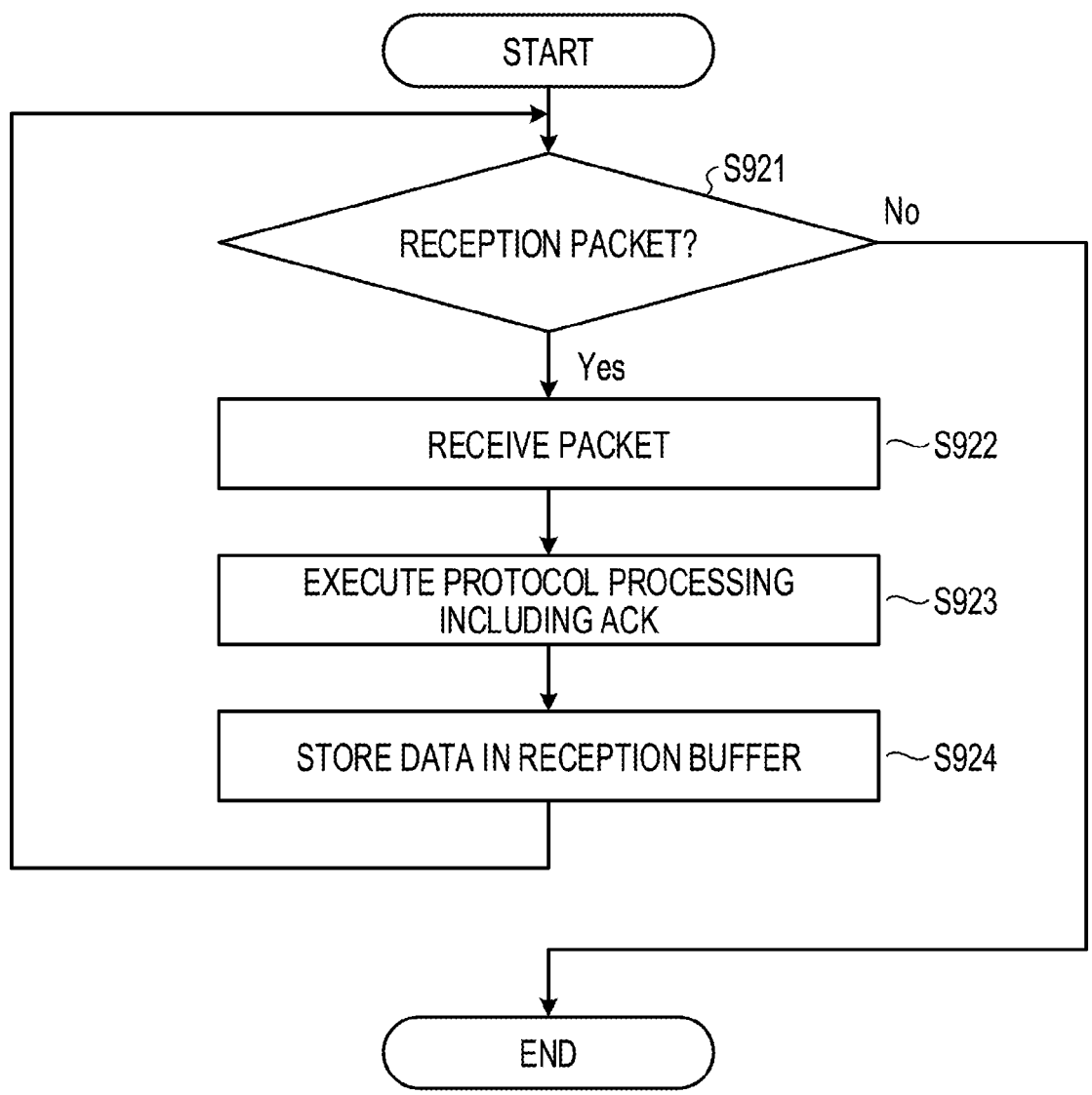
FIG. 27 is a flowchart of the reception processing by the server according to the seventh embodiment.

Next, with reference to FIGS. 25 to 27, descriptions will be made on the flow of the flow management processing by the server 200 according to the present embodiment. FIG. 25 is a flowchart of the entire processing of the flow management by the server according to the seventh embodiment. FIG. 26 is a flowchart of the transmission processing by the server according to the seventh embodiment. FIG. 27 is a flowchart of the reception processing by the server according to the seventh embodiment.

With reference to FIG. 25, descriptions will be made on the entire flow of the flow management processing by the server 200 according to the present embodiment.

The communication unit 221 establishes a connection with the communication partner (step S901).

The flow determination unit 222 initializes information of the flow transmission amount to 0 (step S902).

Next, the flow determination unit 222 executes a transmission processing of transmitting a packet to a communication partner (step S903).

Thereafter, the communication unit 221 executes a reception processing of receiving a packet from the communication partner (step S904).

The communication unit 221 determines whether to disconnect the connection with the communication counterpart (step S905). When it is determined that the connection is not to be disconnected ("No" in step S905), the flow management processing returns to step S903.

In contrast, when it is determined that the connection is to be disconnected ("Yes" in step S905), the communication unit 221 disconnects the connection with the communication partner and ends the communication (step S906). As a result, the flow management processing is also terminated.

Next, the flow of the packet transmission processing in the server 200 will be described with reference to FIG. 26. Each processing included in the flow described in FIG. 26 corresponds to an example of the processing executed in step S903 of FIG. 25.

The flow determination unit 222 determines whether there is a transmission packet depending on whether the input of the packet is received from the communication unit 221 (step S911). When it is determined that there is no packet to be transmitted ("No" in step S911), the flow determination unit 222 ends the packet transmission processing.

In contrast, when it is determined that there is a packet to be transmitted ("Yes" in step S911), the flow determination unit 222 determines whether the transmission amount is equal to or greater than the determination threshold value (step S912). When it is determined that the transmission amount is less than the determination threshold value ("No" in step S912), the flow determination unit 222 adds the short information to the packet as information indicating the flow type (step S913).

In contrast, when it is determined that the transmission amount is equal to or greater than the determination threshold value ("Yes" in step S912), the flow determination unit 222 determines whether the queue used at the previous transmission of the packet belonging to the flow is a short queue (step S914). When it is determined that the long queue is used at the previous transmission ("No" in step S912), the flow determination unit 222 proceeds to step S916.

In contrast, when it is determined that the short queue is used at the previous transmission ("Yes" in step S914), the flow determination unit 222 determines whether the ACK for the previous packet transmission has been received (step S915). When it is determined that the ACK for the previous packet transmission has not been received ("No" in step S915), the flow determination unit 222 ends the packet transmission processing.

In contrast, when it is determined that a notification of the ACK reception in response to the previous packet transmission is received from the communication unit 221 ("Yes" in step S915), the long information is added to the packet as information indicating the flow type (step S916).

Next, the flow determination unit 222 transmits a packet in which the value is set in the priority field to the switch 100 (step S917).

Next, the flow determination unit 222 adds the packet length to the flow transmission amount (step S918). Thereafter, the flow determination unit 222 returns to step S911.

Next, with reference to FIG. 27, the flow of the packet reception processing in the server 200 will be described. Each processing in the flow described in FIG. 27 corresponds to an example of the processing executed in step S904 of FIG. 25.

The communication unit 221 determines whether there is a received packet (step S921). When it is determined that there is no received packet ("No" in step S921), the communication unit 221 ends the reception processing of the packet.

In contrast, it is determined that there is a received packet ("Yes" in step S921), the communication unit 221 receives the packet (step S922).

Next, when the received packet is a packet including the ACK, the communication unit 221 executes a protocol processing including the ACK (step S923). Then, the communication unit 221 notifies the flow determination unit 222 of the reception of the ACK.

Next, when data is included in the received packet, the communication unit 221 acquires data from the packet and stores the data in the reception buffer 224 (step S924). Thereafter, the communication unit 221 returns to step S921.

As described above, in the information processing system according to the present embodiment, the server side executes a processing of managing the flow type and suppressing the overtaking of the packet, and executes a queue scheduling that suppresses the occurrence of congestion on the switch side. In this way, even when the flow management processing and the congestion control processing are separated by the server and the switch, the data transfer performance may be maintained in both the long queue and the short queue. Further, in the case of the configuration according to the present embodiment, since the switch performs a normal congestion control, it is not necessary to prepare a special switch. Therefore, it is easy to introduce the information processing system according to the present embodiment.

Figure 28:
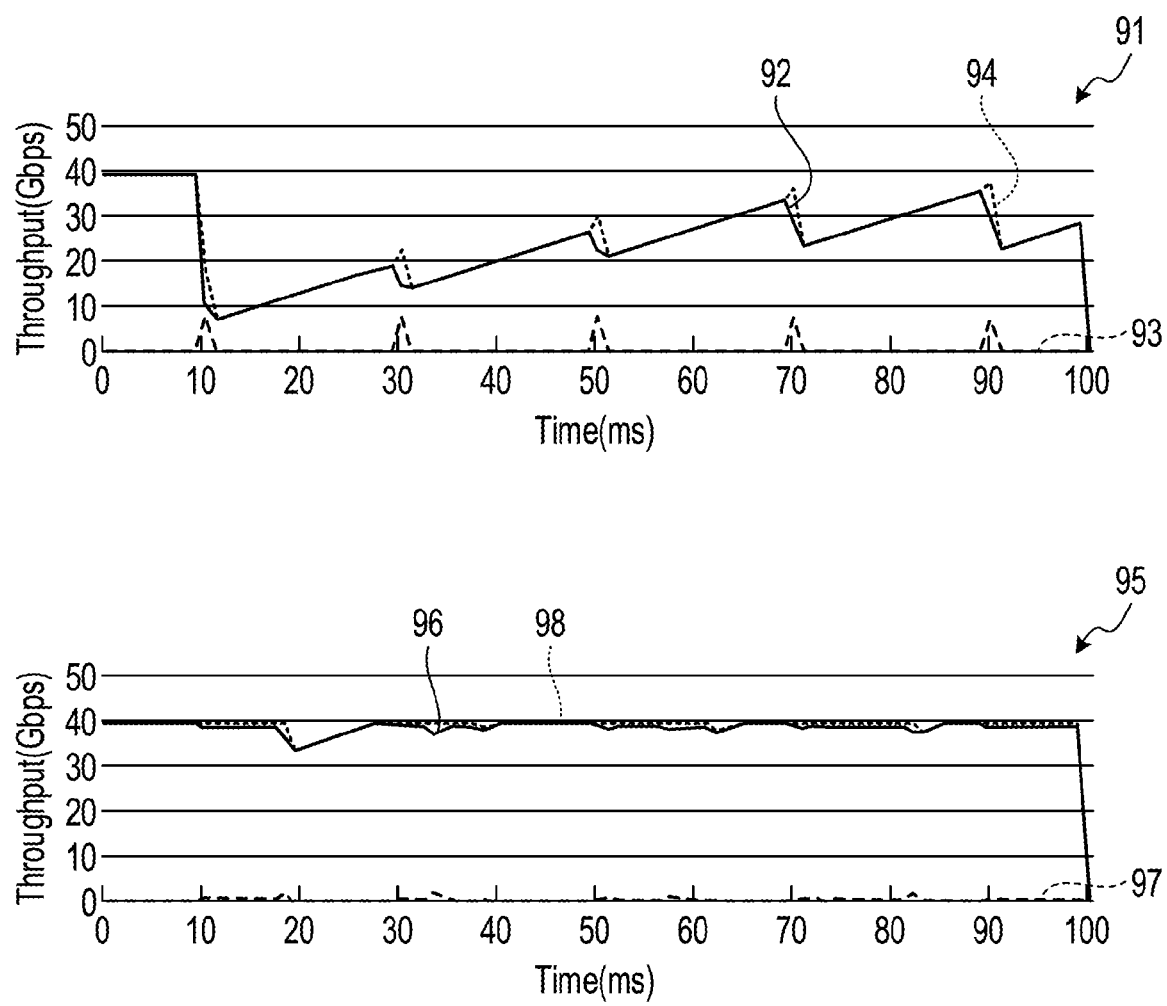
FIG. 28 is a diagram for explaining the effect obtained when the switch of according to the fifth embodiment is used.

FIG. 28 is a diagram for explaining the effect obtained when the switch of the fifth embodiment is used. A graph 91 represents a change in throughput when microburst occurs in a case where the switch 100 of the fifth embodiment is not used. A graph 95 represents the change in throughput when microburst occurs in a case where the switch 100 of the fifth embodiment is used. Both graphs 91 and 95 indicate the throughput on the vertical axis and time on the horizontal axis.

A line segment 92 in the graph 91 represents the throughput in the long queue. A line segment 93 represents the throughput in the short queue. A line segment 94 represents the throughput obtained by combining the long queue and the short queue.

As indicated by the line segment 93, the throughput sharply rises occasionally in the short queue due to the occurrence of microburst. Then, as indicated by the line segment 92, the throughput of the long queue is influenced by the sharp increase in the throughput in the short queue and decreases at the time of the occurrence of microburst. As a result, the overall throughput also decreases at the time of the occurrence of microburst as indicated by the line segment 94.

Meanwhile, the line segment 96 in the graph 95 represents the throughput in the long queue. A line segment 97 represents the throughput in the short queue. A line segment 98 represents the throughput obtained by combining the long queue and the short queue.

As indicated by the line segment 97, the throughput sharply rises occasionally in the short queue due to the occurrence of microburst as in the graph 91. However, even when a sharp rise in throughput occurs in the short queue, the throughput of the long queue is not substantially influenced and the speed is maintained as indicated by the line segment 96. In this case, the overall throughput may be maintained even when the microburst occurs as indicated by the line segment 98. Here, the switch 100 of the fifth embodiment has been taken as an example, but substantially the same effect may be obtained with the switch 100 according to the sixth and seventh embodiments. Therefore, it may be seen that even when the congestion control by the DCQCN is performed, it is possible to avoid a large performance degradation at the time of the occurrence of microburst by using the switch 100 described in the fifth to seventh embodiments.

The function of the switch 100 described in the fifth to seventh embodiments may also be implemented by, for example, the LSI. For example, the storage device using the LSI stores various programs including programs the implement the functions of the relay processing unit 102, the flow identification unit 103, the flow determination processing unit 104, and the queue switching processing unit 105 illustrated in FIGS. 18 and 23. Then, the control circuit using the LSI reads various programs from the storage device and executes the programs, thereby implementing the functions of the relay processing unit 102, the flow identification unit 103, the flow determination processing unit 104, and the queue switching processing unit 105.

Figure 29:
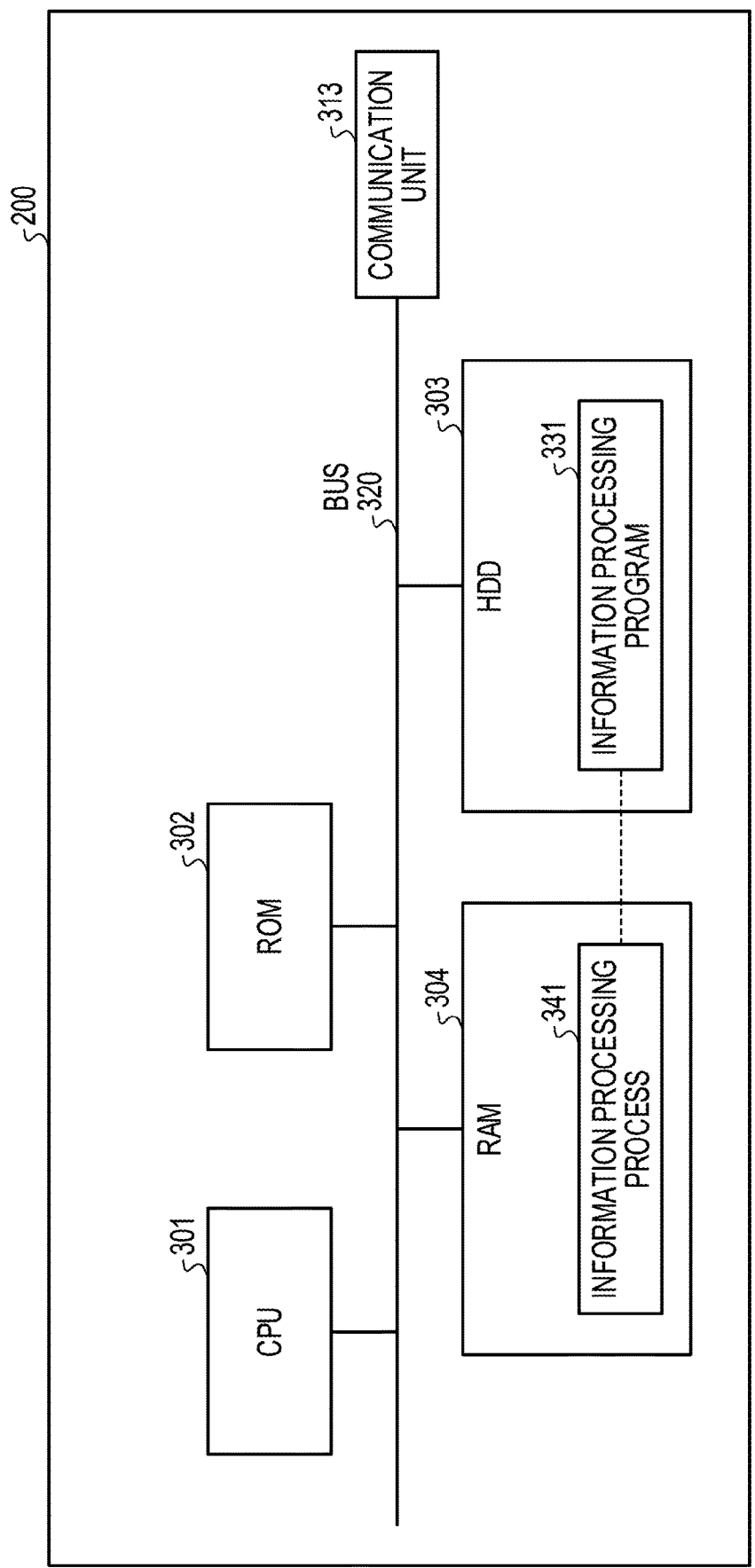
FIG. 29 is a diagram illustrating a hardware configuration example of the server according to the seventh embodiment.

FIG. 29 is a diagram illustrating a hardware configuration example of the server 200 according to the seventh embodiment. The switch 100 may have a similar hardware configuration. As illustrated in FIG. 29, the server 200 includes a central processing unit (CPU) 301, a read only memory (ROM) 302, a hard disk drive (HDD) 303, a random access memory (RAM) 304, and a communication unit 313. The CPU 301, the ROM 302, the HDD 303, the RAM 304, and the communication unit 313 are connected with each other via a bus 320.

As illustrated in FIG. 29, an information processing program 331 is stored in the HDD 303 (or the ROM 302) so as to include a program that implements the functions of the communication unit 221 and the flow determination unit 222 illustrated in, for example, FIG. 23. The RAM 304 implements the function of the reception buffer 224.

The CPU 301 reads the information processing program 331 from the HDD 303, and develops the information processing program 331 to the RAM 304. As a result, as illustrated in FIG. 29, the information processing program 331 functions as an information processing process 341. This information processing process 341 implements the functions of the communication unit 221 and the flow determination unit 222 by developing and using the various data read from the HDD 303 to the area allocated to the information processing process 341 in the storage area of the RAM 304. In addition, the above-described information processing program 331 may not necessarily be stored in the HDD 303 or the ROM 302 from the beginning. For example, the information processing program 331 is stored in a so-called "portable physical medium" inserted in the server 200. Examples of the portable physical medium include a flexible disk (FD), a compact disc (CD)-ROM, a digital versatile disc (DVD), a magneto optical disc, and an integrated circuit (IC). Then, the server 200 may acquire and execute the information processing program 331 from these portable physical media. The information processing program 331 may be configured to be stored in another computer or a server device connected to the server 200 via a public line, the Internet, a LAN, or a WAN, and the server 200 may be configured to acquire and execute the information processing program 331 from the computer or server device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
 a memory that includes a plurality of queues each of which stores a part of a plurality of packets and sequentially outputs a stored part of the plurality of packets; and a processor coupled to the memory and the processor configured to:
acquire a feature amount related to a flow composed of a plurality of packets; and
control a transmission of the plurality of packets based on the acquired feature amount,
control a transmission rate of the plurality of packets to be equal to or less than a predetermined value,
suppress congestion of the plurality of packets,
determine an output queue to which one of the plurality of packets is to be transmitted based on a retention amount of the plurality of packets in addition to the feature amount, and
transmit the one of the plurality of packets to the output queue.

2. The information processing apparatus according to claim 1, wherein the processor is further configured to transmit the one of the plurality of packets to the output queue when none of the plurality of packets is accumulated in the plurality of queues.

3. The information processing apparatus according to claim 1, wherein the processor is further configured to:
determine a first queue of the plurality of queues as the output queue when the feature amount is equal to or more than a predetermined threshold value; and
determine a second queue of the plurality of queues as the output queue when the feature amount is less than the predetermined threshold value.

4. The information processing apparatus according to claim 1, wherein the processor is further configured to:
acquire a transfer amount of the plurality of packets as the feature amount;
determine a first queue of the plurality of queues as the output queue when the transfer amount is equal to or more than a predetermined threshold value; and
determine a second queue of the plurality of queues as the output queue when the transfer amount is less than the predetermined threshold value.

5. The information processing apparatus according to claim 1, wherein the processor is further configured to select the output queue to which one of the plurality of packets is to be transmitted such that an output bandwidth of each queue becomes a predefined ratio.

6. An information processing system comprising:
a first communication apparatus including a first memory and a first processor coupled to the first memory;
a second communication apparatus including a second memory and a second processor coupled to the second memory; and
a packet processing device including a third memory and a third processor coupled to the third memory, the third memory includes a plurality of queues each of which stores a part of a plurality of packets and sequentially outputs a stored part of the plurality of packets,
the first processor is configured to transmit a packet destined to the second communication apparatus via the packet processing device,
the second processor is configured to receive the packet transmitted from the first communication apparatus via the packet processing device, and
the third processor is configured to:
identify a flow composed of a plurality of packets transmitted from the first communication apparatus to the second communication apparatus;
acquire a feature amount related to the identified flow; and
control a transmission of the plurality of packets to the second communication apparatus based on the acquired feature amount,
control a transmission rate of the plurality of packets to be equal to or less than a predetermined value,
suppress congestion of the plurality of packets,
determine an output queue to which one of the plurality of packets is to be transmitted based on a retention amount of the plurality of packets in addition to the feature amount, and
transmit the one of the plurality of packets to the output queue.

7. The information processing system according to claim 6, further comprising: a switch that is arranged between the first communication apparatus and the second communication apparatus and includes the packet processing device.

8. The information processing system according to claim 6, further comprising:
a switch that is arranged between the first communication apparatus and the second communication apparatus and includes a fourth memory and a fourth processor coupled to the fourth memory,
wherein the first communication apparatus includes the packet processing device,
the fourth processor is configured to:
control the transmission rate of the plurality of packets to be a predetermined rate; and
suppress congestion of the plurality of packets, and
the second processor is further configured to receive the packet transmitted from the first communication apparatus via the switch.

9. A non-transitory computer-readable recording medium having stored therein a program that causes a computer to execute a process, the process comprising:
identifying a flow composed of a plurality of packets;
acquiring a feature amount related to the flow; and
controlling a transmission of the plurality of packets based on the acquired feature amount,
controlling a transmission rate of the plurality of packets to be equal to or less than a predetermined value,
suppressing congestion of the plurality of packets,
determining an output queue to which one of the plurality of packets is to be transmitted based on a retention amount of the plurality of packets in addition to the feature amount, and
transmitting the one of the plurality of packets to the output queue, and
the output queue is one of a plurality of queues included in a memory each of which stores a part of the plurality of packets and sequentially outputs a stored part of the plurality of packets.

* * * * *